United States Patent
Lee et al.

(10) Patent No.: US 12,120,068 B2
(45) Date of Patent: Oct. 15, 2024

(54) METHOD AND APPARATUS FOR SUPPORTING FULL DUPLEX OPERATION IN WIRELESS COMMUNICATION SYSTEM

(71) Applicant: Samsung Electronics Co., Ltd., Gyeonggi-do (KR)

(72) Inventors: Kwonjong Lee, Gyeonggi-do (KR); Hyojin Lee, Gyeonggi-do (KR); Jaehyun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 168 days.

(21) Appl. No.: 17/604,262

(22) PCT Filed: Apr. 8, 2020

(86) PCT No.: PCT/KR2020/004725
§ 371 (c)(1),
(2) Date: Oct. 15, 2021

(87) PCT Pub. No.: WO2020/213877
PCT Pub. Date: Oct. 22, 2020

(65) Prior Publication Data
US 2022/0200777 A1    Jun. 23, 2022

(30) Foreign Application Priority Data
Apr. 17, 2019 (KR) .................. 10-2019-0045030

(51) Int. Cl.
*H04L 5/14* (2006.01)
*H04L 5/16* (2006.01)

(52) U.S. Cl.
CPC .............. *H04L 5/1461* (2013.01); *H04L 5/16* (2013.01)

(58) Field of Classification Search
CPC ....... H04L 5/0053; H04L 5/14; H04L 5/1461; H04L 5/16; H04W 72/0453; H04W 72/23
See application file for complete search history.

(56) References Cited

U.S. PATENT DOCUMENTS

2009/0268645 A1\* 10/2009 Chindapol ............ H04L 5/0091
370/329
2013/0021954 A1   1/2013 Montojo et al.
(Continued)

FOREIGN PATENT DOCUMENTS

| EP | 3001581 | 3/2016 |
|---|---|---|
| GB | 2498559 | 7/2013 |

(Continued)

OTHER PUBLICATIONS

European Search Report dated Mar. 25, 2022 issued in counterpart application No. 20791852.5-1215, 7 pages.
(Continued)

*Primary Examiner* — Mansour Oveissi
(74) *Attorney, Agent, or Firm* — The Farrell Law Firm, P.C.

(57) ABSTRACT

The present disclosure relates to a communication technique for converging an IoT technology with a 5G communication system for supporting a higher data transfer rate beyond the 4G system, and a system therefor. The present disclosure may be applied to intelligent services (for example, smart homes, smart buildings, smart cities, smart cars or connected cars, health care, digital education, retail, security- and safety-related services, etc.) on the basis of 5G communication and IoT-related technologies. The present invention provides an apparatus and a method for supporting a full duplex operation in a wireless communication system.

15 Claims, 25 Drawing Sheets

(56) References Cited

U.S. PATENT DOCUMENTS

| | | | |
|---|---|---|---|
| 2013/0188530 A1 | 7/2013 | Pirskanen et al. | |
| 2014/0313945 A1 | 10/2014 | Beale | |
| 2014/0328228 A1 | 11/2014 | Park et al. | |
| 2015/0244505 A1 | 8/2015 | Celebi et al. | |
| 2018/0084506 A1* | 3/2018 | Min | H04L 5/14 |
| 2021/0368481 A1* | 11/2021 | Jo | H04W 72/21 |
| 2022/0029761 A1* | 1/2022 | Su | H04L 27/2613 |
| 2022/0159596 A1* | 5/2022 | Kim | H04B 17/336 |

FOREIGN PATENT DOCUMENTS

| | | |
|---|---|---|
| KR | 10-2014-0109893 | 9/2014 |
| KR | 10-2016-0124778 | 10/2016 |
| KR | 10-1853756 | 5/2018 |
| KR | 10-2018-0111915 | 10/2018 |
| KR | 10-1920496 | 11/2018 |

OTHER PUBLICATIONS

PCT/ISA/210 Search Report issued on PCT/KR2020/004725, Jul. 8, 2020, pp. 7.
PCT/ISA/237 Written Opinion issued on PCT/KR2020/004725, Jul. 8, 2020, pp. 4.
Ericsson, "CR for Late drop capabilities", R2-1901556, 3GPP TSG-RAN2 Meeting #105, Athens, Greece, Feb. 22, 2019, pp. 102.
Nokia, 'LTE 410-430 MHz CR to TS 36.101', R4-1903530, 3GPP TSG-RAN WG4 Meeting #90bis, Xian, China, Apr. 1, 2019, pp. 49.

* cited by examiner

FD CRB

HD CRB

METHOD AND APPARATUS FOR SUPPORTING FULL DUPLEX OPERATION IN WIRELESS COMMUNICATION SYSTEM

PRIORITY

This application is a National Phase Entry of PCT International Application No. PCT/KR2020/004725, which was filed on Apr. 8, 2020, and claims priority to Korean Patent Application No. 10-2019-0045030, which was filed on Apr. 17, 2019, the content of each of which is incorporated herein by reference.

TECHNICAL FIELD

The disclosure is to support a full-duplex operation in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Unlike time division duplexing (TDD) or frequency division duplexing (FDD) systems, an in-band full duplex system is a system in which an uplink signal and a downlink signal of the same cell are simultaneously transmitted within the same band and the same time resource. In such a full duplex system, since the uplink signal and the downlink signal coexist in the same cell, the uplink signal and the downlink signal act as mutual interference. Therefore, in the full duplex system, in order to improve communication performance, it is necessary to discuss a method of performing communication in consideration of the above-described interference between signals.

DISCLOSURE OF INVENTION

Technical Problem

The disclosure is to provide a method in which a base station notifies a UE of an area configured in a full-duplex mode among the operation areas of the UE in a system in which the full-duplex mode is supported.

In another aspect, the disclosure is to provide a method for supporting different communication operations in an area configured in a full-duplex mode and an area configured in a half-duplex mode, respectively.

Solution to Problem

In order to achieve the above tasks, a method performed by a base station in a wireless communication system according to an embodiment of the disclosure includes: configuring a first area corresponding to a full-duplex (FD) mode and a second area corresponding to a half-duplex (HD) mode in a bandwidth part activated for a terminal, generating information indicating the first area and the second area; and transmitting, to the terminal, the generated information.

Further, a method performed by a terminal in a wireless communication system according to an embodiment of the disclosure includes: receiving, from a base station, information indicating a first area corresponding to a full-duplex (FD) mode and a second area corresponding to a half-duplex (HD) mode in a bandwidth part activated for the terminal; identifying the first area and the second area in the activated bandwidth part based on the received information; and performing a first communication operation on the identified first area and performing a second communication operation on the identified second area.

Also, a base station in a wireless communication system according to an embodiment of the disclosure includes: a transceiver; and a controller configured to configure a first area corresponding to a full-duplex (FD) mode and a second area corresponding to a half-duplex (HD) mode in a bandwidth part activated for a terminal, generate information indicating the first area and the second area, and control the transceiver to transmit, to the terminal, the generated information.

Further, a terminal in a wireless communication system according to an embodiment of the disclosure includes: a transceiver: and a controller configured to control the transceiver to receive, from a base station, information indicating a first area corresponding to a full-duplex (FD) mode and a second area corresponding to a half-duplex (HD) mode in a bandwidth part activated for the terminal, identify the first area and the second area in the activated bandwidth part based on the received information, perform a first communication operation on the identified first area, and perform a second communication operation on the identified second area.

Advantageous Effects of Invention

According to an embodiment of the disclosure, a UE receives information on an area configured in a full-duplex mode and an area configured in a half-duplex mode from a base station, and performs communication according to a more appropriate communication method for each identified area based on the received information. Therefore, the disclosure can significantly improve the communication performance in a full-duplex system.

BEST MODE FOR CARRYING OUT THE INVENTION

Figure 1:
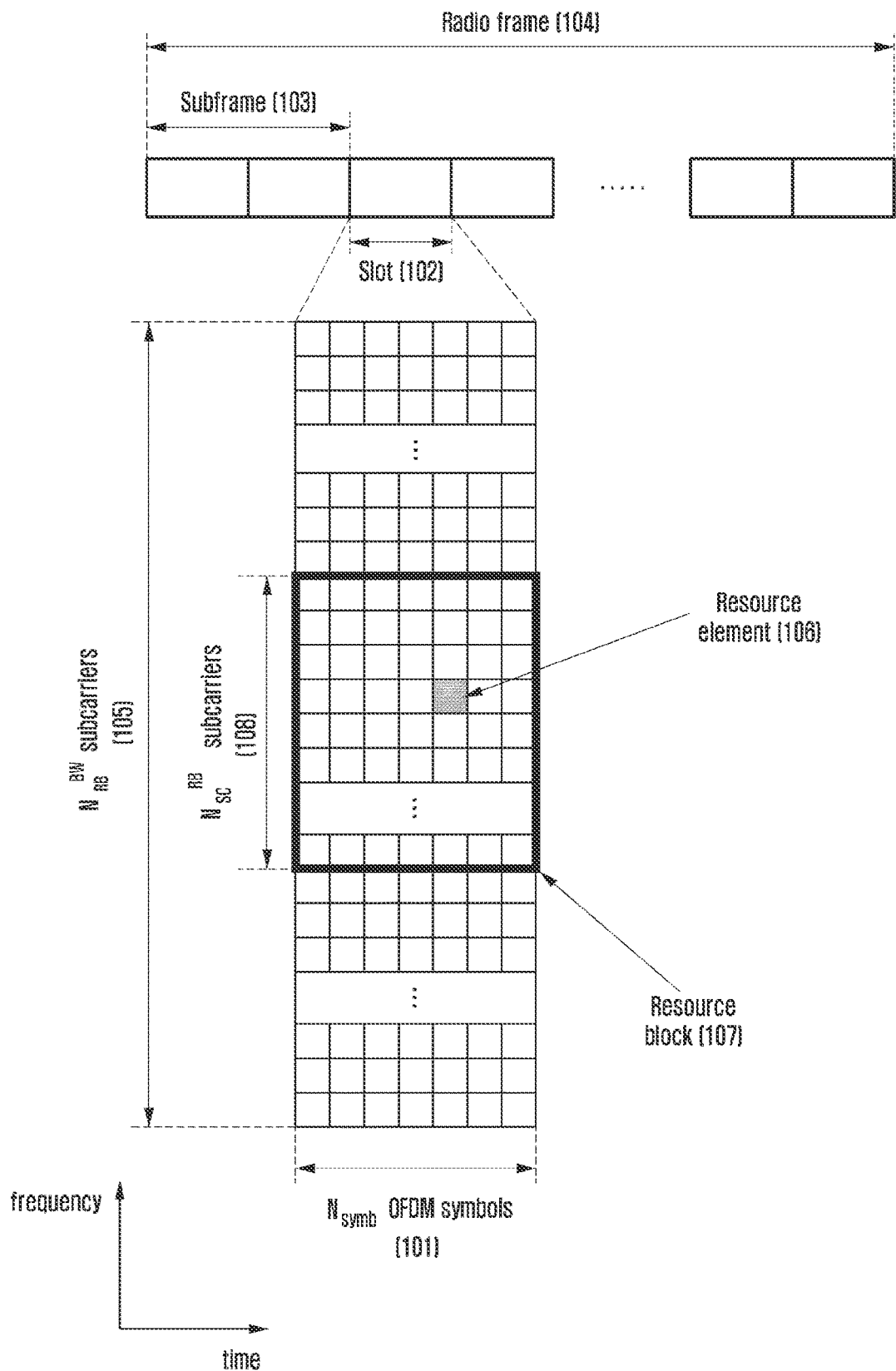
FIG. 1 is a diagram illustrating a basic structure of a time-frequency domain in LTE.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

A wireless communication system is evolving, away from an initial voice-oriented service, into a broadband wireless communication system that provides a high-speed and high-quality packet data service in a communication standard such as 3GPP's high speed packet access (HSPA), long term evolution (LTE or evolved universal terrestrial radio access (E-UTRA)), LTE-advanced (LTE-A), LTE-Pro, 3GPP2's high rate packet data (HRPD), ultra-mobile broadband (UMB), and IEEE 802.16e.

As a representative example of the broadband wireless communication system, in an LTE system, an orthogonal frequency division multiplexing (OFDM) scheme is employed in downlink (DL), and a single carrier frequency division multiple access (SC-FDMA) scheme is employed in uplink (UL). Uplink refers to a radio link in which a user equipment (UE) or a mobile station (MS) transmits data or control signals to a base station (eNode B or BS; base station), and downlink refers to a radio link in which a base station transmits data or control signals to a UE. In the multiple access method as described above, data or control information of each user is divided by allocating and operating time-frequency resources to which the data or the control information is to be transmitted for each user so that they do not overlap each other, that is, orthogonality is established.

As a future communication system after LTE, the 5G communication system must be able to freely reflect various requirements of users and service providers so that services that simultaneously satisfy various requirements must be supported. Services considered for the 5G communication system include enhanced mobile broadband (eMBB), massive machine type communication (mNTC), and ultra-reliability low latency communication (URLLC), and the like.

eMBB aims to provide more improved data transfer rates than the data transfer rates supported by existing LTE, LTE-A or LTE-Pro. For example, in a 5G communication system, the eMBB should be able to provide a maximum data rate of 20 Gbps in the downlink and a maximum data rate of 10 Gbps in the uplink from the viewpoint of one base station. In addition, the 5G communication system must provide the maximum transmission speed and at the same time provide the increased user perceived data rate of the UE. In order to satisfy such a requirement, it is required to improve various transmission/reception technologies, including a more advanced multi-antenna (MIMO) transmission technology. In addition, while transmitting signals using a transmission bandwidth of up to 20 MHz in the 2 GHz band currently used by LTE, the 5G communication system can satisfy the data transmission rate required by the 5G communication system by using a frequency bandwidth wider than 20 MHz in a frequency band of 3 to 6 GHz or 6 GHz or higher.

At the same time, mMTC is being considered to support application services such as Internet of Things (IoT) in the 5G communication system. In order to efficiently provide the IoT, mMTC requires large-scale terminal access support within a cell, improved UE coverage, improved battery life, and reduced UE cost. Since the IoT is attached to various sensors and various devices to provide communication functions, it must be able to support a large number of UEs (e.g., 1,000,000 UEs/km$^2$) within a cell. In addition, since a UE supporting mMTC is highly likely to be located in a shaded area not covered by a cell, such as the basement of a building, due to the characteristics of the service, it requires wider coverage compared to other services provided by the 5G communication system. A UE supporting mMTC must be composed of a low-cost UE, and since it is difficult to frequently exchange the battery of the UE, a very long battery life-time such as 10 to 15 years is required.

Finally, URLLC is a cellular-based wireless communication service used for a specific purpose (mission-critical). For example, services used in remote control for a robot or machine, industrial automation, unmanned aerial vehicle, remote health care, emergency alert, and the like may be considered. Therefore, the communication provided by URLLC must provide very low latency and very high reliability. For example, a service supporting URLLC must satisfy an air interface latency of less than 0.5 milliseconds, and at the same time have a requirement of a packet error rate of 10-5 or less. Therefore, for a service that supports URLLC, the 5G system must provide a smaller transmit time interval (TTI) than other services. At the same time, in order to secure the reliability of the communication link, design considerations for allocating wide resources in the frequency band are required.

The three services of 5G, namely eMBB. URLLC, and mMTC, can be multiplexed and transmitted in one system. In this case, in order to satisfy different requirements of each service, different transmission/reception techniques and transmission/reception parameters may be used between services.

Hereinafter, frame structures of LTE and LTE-A systems will be described in more detail with reference to the drawings.

FIG. 1 is a diagram illustrating a basic structure of a time-frequency domain, which is a radio resource domain in which a data or control channel is transmitted in a system in LTE.

In FIG. 1, the horizontal axis represents a time domain, and the vertical axis represents a frequency domain. A minimum transmission unit in the time domain is an OFDM symbol, and $N_{symb}$ OFDM symbols 101 may be gathered to constitute one slot 102, and two slots may be gathered to constitute one subframe 103. The length of the slot is 0.5 ms, and the length of the subframe is 1.0 ms.

A radio frame 104 is a time domain unit composed of 10 subframes. A minimum transmission unit in the frequency domain is a subcarrier, and the bandwidth of the entire system transmission bandwidth is composed of a total of $N_{BW}$ subcarriers 105. A basic unit of a resource in the time-frequency domain is a resource element (RE) 106 and may be represented by an OFDM symbol index and a subcarrier index. A resource block (RB or physical resource block {PRB}) 107 is defined as $N_{symb}$ consecutive OFDM symbols 101 in the time domain and $N_{RB}$ consecutive subcarriers 108 in the frequency domain. Accordingly, one RB 108 is composed of $N_{symb} \times N_{RB}$ REs 106. In general, the minimum transmission unit of data is the RB unit. In the LTE system, $N_{symb}=7$ and $N_{RB}=12$, and $N_{BW}$ and $N_{RB}$ are generally proportional to the bandwidth of the system transmission band.

Next, downlink control information (DCI) in LTE and LTE-A systems will be described in detail.

In the LTE system, scheduling information for downlink data or uplink data is transmitted from a base station to a UE through DCI. DCI defines various formats, and a fixed DCI format may be applied and operated according to whether the corresponding DCI is scheduling information on downlink data or scheduling information on uplink data, whether the corresponding DCI is compact DCI with a small size of control information, whether spatial multiplexing using multiple antennas is applied, whether the corresponding DCI is for power control, and the like. For example, DCI format 1, which is scheduling control information for downlink data, is configured to include at least the following control information.

Resource allocation type 0/1 flag: Notifies whether resource allocation method is type 0 or type 1. Type 0 allocates resources in resource block group (RBG) unit by applying bitmap method. Basic unit of scheduling in LTE system is resource block (RB) expressed by time and frequency domain resources, and RBG is composed of a plurality of RBs and becomes basic unit of scheduling in type 0 scheme. Type 1 allows allocating specific RB within RBG.

Resource block allocation: Notifies RB allocated for data transmission. Resource to be expressed is determined according to system bandwidth and resource allocation method.

Modulation and coding scheme (MCS): Notifies modulation method used for data transmission and size of transport block, which is data to be transmitted.

HARQ process number: Notifies process number of HARQ.

New data indicator: Notifies whether corresponding transmission is HARQ initial transmission or retransmission.

Redundancy version: Notifies redundant version of HARQ.

Transmit power control command for physical uplink control channel (PUCCH)): Notifies transmit power control command for PUCCH, which is uplink control channel.

The DCI is transmitted through a physical downlink control channel (PDCCH), which is a downlink physical control channel, through a channel coding and modulation process.

A cyclic redundancy check (CRC) is attached to a DCI message payload, and the CRC is scrambled with a radio network temporary identifier (RNTI) corresponding to the identity of the UE. In the DCI, different RNTIs are used according to the purpose of the message, for example, UE-specific data transmission, a power control command, or a random access response. That is, the RNTI is not explicitly transmitted, but included in a CRC calculation process and transmitted. Upon receiving the DCI message transmitted on the PDCCH, the UE identifies the CRC using the assigned RNTI, and it can be known that the corresponding message has been transmitted to the UE w % ben the CRC identification result is correct.

Figure 2:
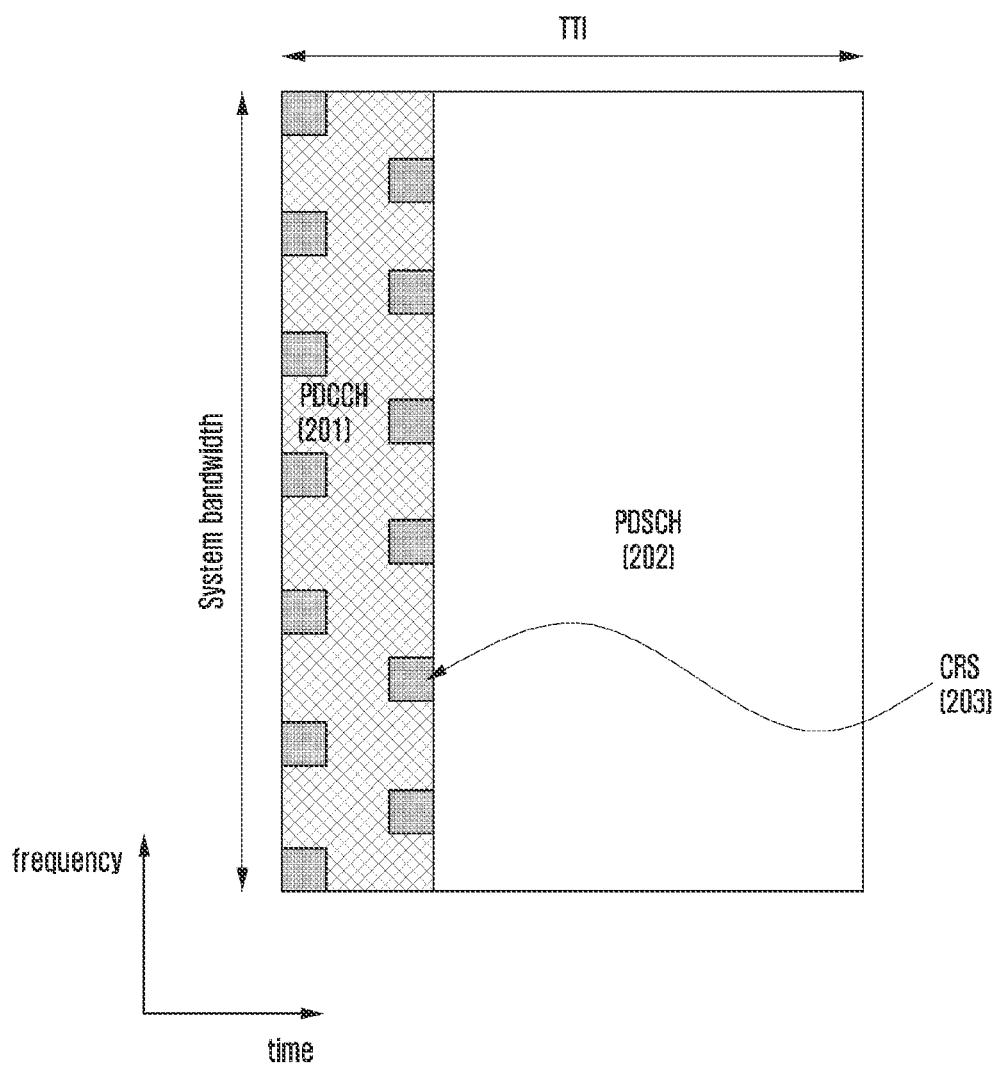
FIG. 2 is a diagram illustrating a downlink control channel of LTE.

FIG. 2 is a diagram illustrating a PDCCH 201 that is a downlink physical channel through which DCI of LTE is transmitted.

Referring to FIG. 2, the PDCCH 201 is time-multiplexed with a PDSCH 202, which is a data transmission channel, and is transmitted over the entire system bandwidth. The region of the PDCCH 201 is expressed by the number of OFDM symbols, which is indicated to the UE by a control format indicator (CFI) transmitted through a physical control format indicator channel (PCFICH). By allocating the PDCCH 201 to the OFDM symbol that comes at the beginning of the subframe, the UE can decode downlink scheduling allocation as soon as possible, and through this, it is possible to reduce decoding delay for a downlink shared channel (DL-SCH), that is, the overall downlink transmission delay. Since one PDCCH carries one DCI message and a plurality of UEs can be simultaneously scheduled for downlink and uplink, a plurality of PDCCHs are simultaneously transmitted within each cell.

A cell-specific reference signal (CRS) 203 is used as a reference signal for decoding the PDCCH 201. The CRS 203 is transmitted in every subframe over the entire band, and scrambling and resource mapping vary according to cell identity (ID). Since the CRS 203 is a reference signal commonly used by all UEs, UE-specific beamforming cannot be used. Therefore, a multi-antenna transmission scheme for the PDCCH of LTE is limited to open-loop transmission diversity. The number of ports of the CRS is implicitly known to the UE from decoding of physical broadcast channel (PBCH).

Resource allocation of the PDCCH 201 is based on a control-channel element (CCE), and one CCE is composed of 9 resource element groups (REGs), that is, a total of 36 resource elements (REs). The number of CCEs required for the specific PDCCH 201 may be 1, 2, 4, or 8, which depends on the channel coding rate of the DCI message payload. As described above, the number of different CCEs is used to implement link adaptation of the PDCCH 201. The UE needs to detect a signal without knowing information about the PDCCH 201. In LTE, a search space indicating a set of CCEs is defined for blind decoding.

The search space is composed of a plurality of sets at an aggregation level (AL) of each CCE, which is not explicitly signaled but is implicitly defined through a function and subframe number by the UE identity. In each subframe, the UE performs decoding on the PDCCH 201 for all possible resource candidates that can be made from CCEs in the configured search space, and information declared valid for the UE through CRC identification is processed.

The search space is classified into a UE-specific search space and a common search space. A certain group of UEs or all UEs may investigate the common search space of the PDCCH 201 to receive cell-common control information such as dynamic scheduling or paging messages for system information. For example, scheduling allocation information of a DL-SCH for transmission of a system information block (SIB)-1 including operator information of a cell may be received by investigating the common search space of the PDCCH 201.

In LTE, the entire PDCCH region is composed of a set of CCEs in a logical region, and a search space composed of a set of CCEs exists. The search space is divided into a common search space and a UE-specific search space, and the search space for the LTE PDCCH is defined as follows.

---

A set of PDCCH candidates for monitoring can be defined as a search space.
Here, in aggregation level L ε {1, 2, 4, 8}, search space $S_K^{(L)}$ is defined by
a set of PDCCH candidates. With respect to each serving cell in which PDCCH is monitored, CCEs corresponding to a group m of PDDCCH candidates of search space $S_K^{(L)}$ can be derived by the following Equation.

$$L\left\{(Y_k + m')\mod\left\lfloor \frac{N_{CCE,k}}{L} \right\rfloor\right\} + i$$

Here, $Y_K$ is defined in the below, i = 0, . . . , L − 1. In a common search space, m' = m. In a PDCCH UE-specific search space, when a carrier indicator field in a monitoring UE is configured with respect to the serving cell in which PDCCH is monitored, m' = m + $M^{(L)} \cdot n_{CI}$, $n_{CI}$ is a carrier indicator field value. Unlike this, when the carrier indicator field in the monitoring UE is not configured, m' = m, and m = 0, . . . , $M^{(L)}$ − 1. $M^{(L)}$ is the number of PDCCH candidates for monitoring
in a given search space. The carrier indicator field value is the same as ServCellIndex. In the common search space, $Y_K$ is configured as 0 when the aggregation level L is 4 and 8. In the UE-specific search space $S_K^{(L)}$, a value of $Y_K$ in the aggregation level L is defined by the following Equation.
$Y_k = (A \cdot Y_{k-1})\mod D$
Here, $Y_{-1}$ $n_{RNTI} \neq 0$, A = 39827, D = 65537, k = [$n_3/2$], $n_3$ is a slot number in a radio frame. A value of RNTI used as $n_{RNTI}$ is defined in subclause 7.1 in downlink and subclause 8 in uplink.

---

According to the definition of the search space for the PDCCH described above, the UE-specific search space is not explicitly signaled but is implicitly defined through a function and a subframe number by the UE identity. In other words, since the UE-specific search space can be changed according to the subframe number, this means that the UE-specific search space can be changed over time, and through this, a problem (blocking problem) that a specific UE cannot use the search space by other UEs among UEs is solved.

When any UE cannot be scheduled, since all CCEs the corresponding UE investigates are already being used by other UEs scheduled in the same subframe, in the corresponding subframe, this search space is changed over time, so problems like this may not occur in the next subframe. For example, even if portions of the UE-specific search space of UE #1 and UE #2 overlap in a specific subframe, the UE-specific search space is changed for each subframe, so that the overlap in the next subframe can be expected to be different from this.

According to the definition of the search space for the PDCCH described above, the common search space is defined as a set of promised CCEs because a certain group of UEs or all UEs must receive the PDCCH. In other words, the common search space is not changed according to the identity of the UE or the subframe number. Although the common search space exists to transmit various system messages, the common search space can also be used to transmit control information of individual UEs. Through this, the common search space can be used as a solution to a phenomenon that the UE cannot be scheduled due to insufficient resources available in the UE-specific search space.

The search space is a set of candidate control channels composed of CCEs on which the UE should attempt to decode on a given aggregation level. Here, since there are several aggregation levels that make one bundle with 1, 2, 4, and 8 CCEs, the UE has a plurality of search spaces. In an LTE PDCCH, the number of PDCCH candidates to be monitored by the UE in the search space defined according to the aggregation level is defined in the table below.

TABLE 1

| | search space $S_k^{(L)}$ | | number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| common | 4 | 16 | 4 |
| | 8 | 16 | 2 |

According to Table 1, a UE-specific search space supports aggregation levels {1, 2, 4, 8}, and in this case, the UE-specific search space has {6, 6, 2, 2}-numbered PDCCH candidate groups, respectively. A common search space 302 supports aggregation levels {4, 8}, and in this case, the common search space 302 has {4, 2}-numbered PDCCH candidate groups, respectively. The reason why the common search space supports only the aggregation level of {4, 8} is to improve the coverage characteristics because a system message generally has to reach the cell edge.

DCI transmitted to the common search space is defined only for a specific DCI format, such as 0/1A/3/3A/C, which corresponds to the use for a system message or power control for a UE group. A DCI format with spatial multiplexing is not supported in the common search space. A downlink DCI format to be decoded in the UE-specific search space varies according to a transmission mode configured for the corresponding UE.

Since the transmission mode is configured through radio resource control (RRC) signaling, an exact subframe number for whether the corresponding configuration is effective for the corresponding UE is not specified. Therefore, the UE can be operated so as not to lose communication by always performing decoding on DCI format 1A regardless of the transmission mode.

In the above, a method of transmitting and receiving a downlink control channel and downlink control information and a search space in conventional LTE and LTE-A have been described.

Hereinafter, a downlink control channel in the currently discussed 5G communication system will be described in more detail with reference to the drawings.

Figure 3:
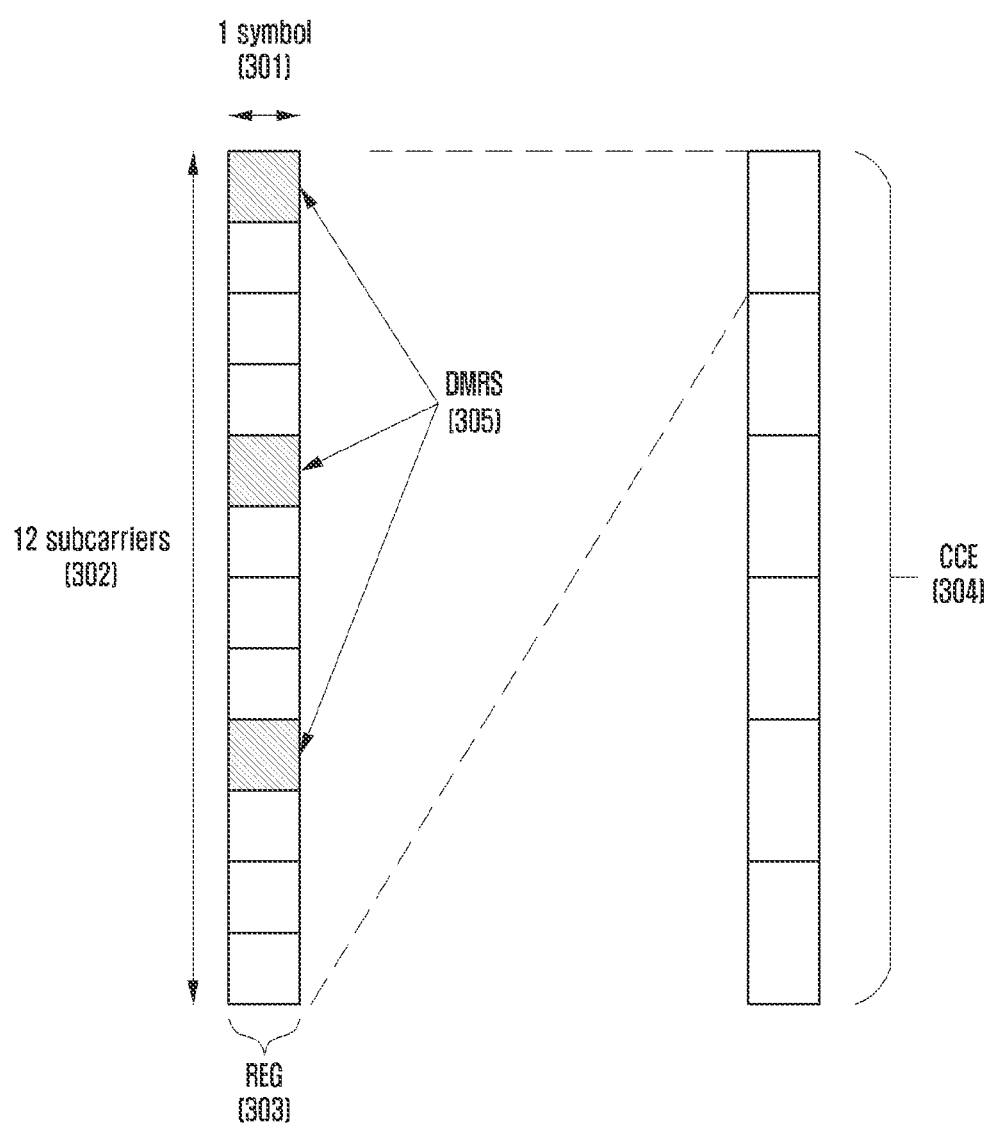
FIG. 3 is a diagram illustrating transmission resources of a downlink control channel in 5G.

FIG. 3 is a diagram illustrating an example of a basic unit of time and frequency resources constituting a downlink control channel that can be used in 5G. According to FIG. 3, the basic unit (REG) of time and frequency resources constituting the control channel is composed of one OFDM symbol 301 on the time axis, and composed of 12 subcarriers 302, that is, one RB on the frequency axis. In configuring the basic unit of the control channel, a data channel and a control channel can be time-multiplexed within one subframe by assuming that the time axis-basic unit is one OFDM symbol 301.

By placing the control channel ahead of the data channel, the processing time of a user can be reduced, so it is easy to satisfy the latency requirement. By configuring the frequency axis-basic unit of the control channel to one RB 302, frequency multiplexing between the control channel and the data channel can be performed more efficiently.

By concatenating the REGs 303 shown in FIG. 3, control channel regions of various sizes can be configured. For example, when a basic unit in which a downlink control channel is allocated in 5G is referred to as a CCE 304, one CCE 304 may be composed of a plurality of REGs 303. Taking the REG 304 shown in FIG. 3 as an example, the REG 303 may be composed of 12 REs, and when one CCE 304 is composed of 6 REGs 303, it means that the one CCE 304 can be composed of 72 REs. When the downlink control region is configured, the corresponding region may be composed of a plurality of CCEs 304, and a specific downlink control channel may be mapped to one or more CCEs 304 according to the aggregation level (AL) in the control region, and transmitted. The CCEs 304 in the control region may be divided by numbers, and in this case, the numbers may be assigned according to a logical mapping method.

The basic unit of the downlink control channel shown in FIG. 3, that is, the REG 303, may include both REs to which DCI is mapped and a region to which a demodulation reference signal (DMRS) 305, which is a reference signal for decoding the Res, is mapped. As in FIG. 3, the DMRS 305 may be transmitted in 6 REs within one REG 303. For reference, since the DMRS 303 is transmitted using the same precoding as the control signal mapped in the REG 303, the UE can decode the control information without information on which precoding the base station has applied.

Figure 4:
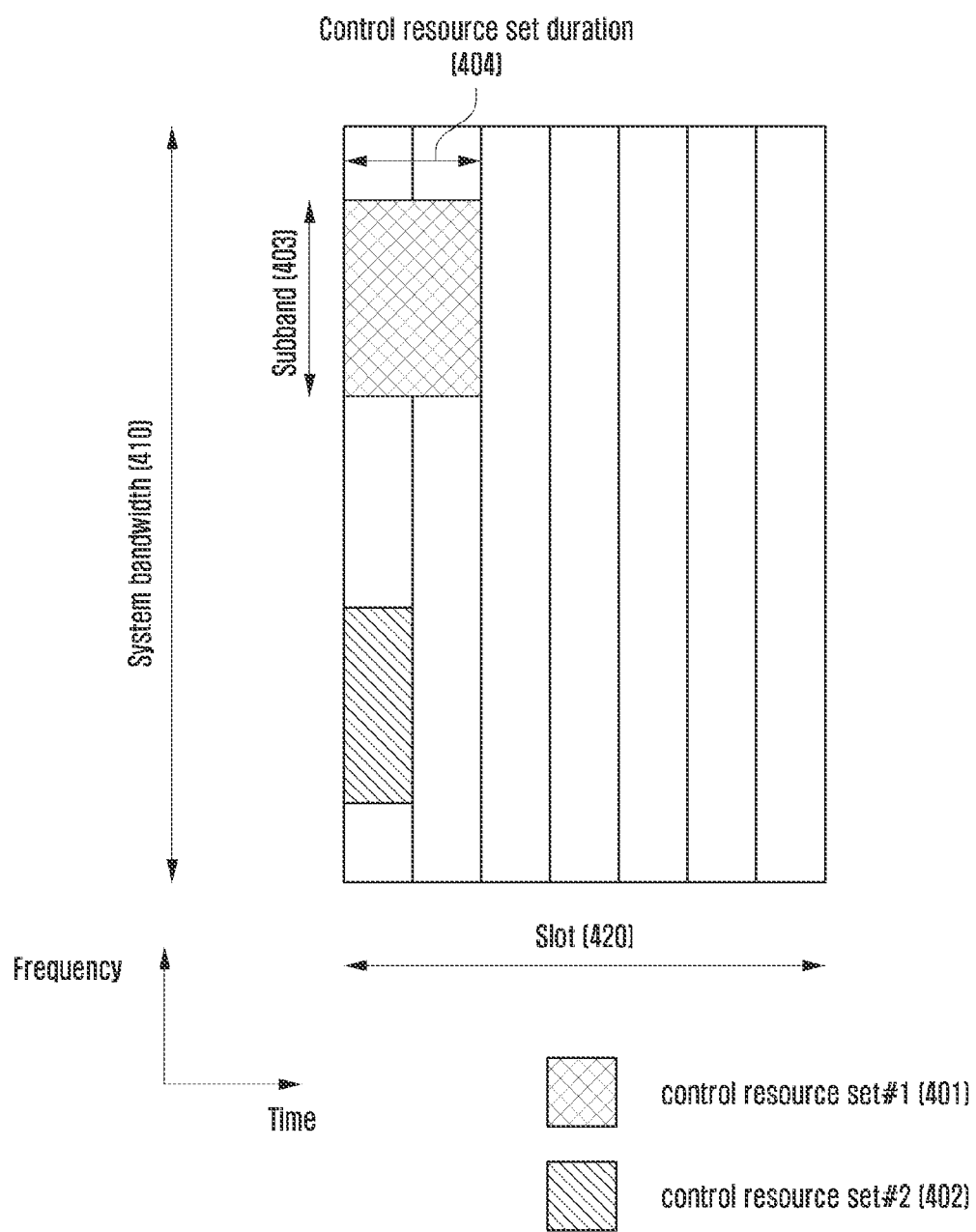
FIG. 4 is a diagram illustrating an example of a configuration for a control region in 5G.

FIG. 4 is a diagram illustrating an example of a control resource set (CORESET) in which a downlink control channel is transmitted in a 5G wireless communication system. FIG. 4 illustrates an example in which a system bandwidth 410 on the frequency axis and two control regions (control region #1 401 and control region #2 402) within one slot 420 on the time axis (in the example of FIG. 4, one slot is assumed to be 7 OFDM symbols) are configured.

The control regions 401 and 402 may be configured to a specific subband 403 within the entire system bandwidth 410 on the frequency axis. The control regions 401 and 402 may be configured to one or more OFDM symbols on the time axis, and this may be defined as a control region length (control resource set duration) 404. In the example of FIG. 4, the control region #1 401 is configured to a control region length of two symbols, and the control region #2 402 is configured to a control region length of one symbol.

The control region in 5G described above may be configured by the base station to the UE through higher layer signaling (e.g., system information, master information block (MIB), or RRC signaling. The configuring the control region to the UE means providing information such as the location of the control region, subbands, resource allocation of the control region, the length of the control region, and the like. For example, the following information may be included.

TABLE 2

- Configuration information 1. Frequency axis-RB allocation information
- Configuration information 2. Control region start symbol
- Configuration information 3. Control region symbol length
- Configuration information 4. REG bundling size (2 or 3 or 6)
- Configuration information 5. Transmission mode (Interleaved transmission method or non-interleaved transmission method)
- Configuration information 6. DMRS configuration information (Precoder granularity)
- Configuration information 7. Search space type (common search space, group-common search space. UE-specific search space)
- Configuration information 8. DCI format to be monitored in corresponding control region
- Others In addition to the above configuration information, various pieces of information necessary for transmitting the downlink control channel may be configured for the UE.

Next, downlink control information (DCI) in 5G will be described in detail.

In the 5G system, scheduling information for uplink data (physical uplink shared channel (PUSCH)) or downlink data (physical downlink shared channel (PDSCH)) is transmitted from the base station to the UE through DCI. The UE may monitor a DCI format for fallback and a DCI format for non-fallback with respect to PUSCH or PDSCH. The DCI format for fallback may be composed of a field fixed between the base station and the UE, and the DCI format for non-fallback may include a configurable field.

The DC format for fallback for scheduling PUSCH may include, for example, the following information.

TABLE 3

- ID of DCI formats – [1] bit
- Frequency domain resource allocation – [[log$_2$(N$_{RB}^{UL,BWP}$(N$_{RB}^{UL,BWP}$ + 1)/2]]-bits
- Time domain resource allocation – X bit
- Frequency hopping flag - -1 bit
- Modulation and coding scheme – [5] bit
- New data indicator – 1 bit
- Redundancy version – [2] bit
- HARQ process number – [4] bit TABLE 3-continued

- TPC command for scheduled PUSCH - [2] bit
- UL/SUL indicator – 0 or 1 bit

The DCI format for non-fallback for scheduling PUSCH may include, for example, the following information.

TABLE 4-1

- Carrier indicator – 0 or 3 bits
- ID for DCI format – [1] bit
- Bandwidth part indicator – 0, 1 or 2 bits
- Frequency domain resource allocation
  • In resource allocation type 0, [N$_{RB}^{UL,BWP}$/P]-bits
  • In resource allocation type 1, [[log$_2$(N$_{RB}^{UL,BWP}$(N$_{RB}^{UL,BWP}$ + 1)/2)]]-bits
- Time domain resource allocation -1, 2, 3, or 4 bits
- VRB-to-PRB mapping – 0 or 1 bits, only for resource allocation type 1
  • 0 bit only when resource allocation type 0 is configured;
  • The remaining is 1 bit.
- Frequency hopping flag -0 or 1 bit, only when resource allocation type 1
  • Only when resource allocation type 0 is configured, 0 bit
  • The remaining is 1 bit
- Modulation and coding scheme – 5 bits
- New data indicator – 1 bit
- Redundancy version – 2 bits as defined in section x.x of {6, TS38.214}
- HARQ process number – 4 bits
- First downlink allocation index – 1 or 2 bits
  • 1 bit for semi-static HARQ codebook

TABLE 4-2

• 2 bits for dynamic HARQ-ACK codebook having single HARQ codebook
  - Second downlink allocation index – 0 or 2 bits
  • 2 bits for dynamic HARQ-ACK codebook having two sub-codebooks;
  • in other cases, 0 bits
  TPC command for scheduled PUSCH – 2 bits
- SRS resource indicator – [log$_2$($\Sigma_{k-1}^{Lmax}$($_k^{NSRS}$))] or [log$_2$(N$_{SRB}$)]-bits
  • [log$_2$($\Sigma_{k-1}^{Lmax}$($_k^{NSRS}$))] -bits for non-codebook based on PUSCH transmission
  • [log$_2$(N$_{SRS}$)] -bits for codebook based on PUSCH transmission
- Precoding information and number of layers – 6 bits or more
- Antenna ports – 5 bits or more
- SRS request – 2 bits
- CSI request – 0, 1, 2, 3, 4, 5, or 6 bits
- CBG transmission information – 0, 2, 4, 6 or 8 bits
- PTRS-DMRS association – 2 bits
- Beta_offset indicator – 2 bits
- DMRS sequence initial configuration – 0 or 1 bits
- UL/SUL indicator – 0 or 1 bits The DCI for fallback for scheduling PDSCH may include, for example, the following information.

TABLE 5

ID for DCI format – [1] bit
- Frequency domain resource allocation -[[log$_2$(N$_{RB}^{DL,BWP}$)(N$_{RB}^{DL,BWP}$ – 1) / 2]]-bits
- Time domain resource allocation – X bits
- Mapping between VRB and PRB – 1 bit
- Modulation and coding scheme – [5] bits
- New data indicator – 1 bit
- Redundancy version – [2] bits
- HARQ process number – [4] bits
- Downlink allocation index – 2 bits
- TPC command for scheduled PUCCH – [2] bits
- PUCCH resource indicator – [2] bits
- PDSCH vs HARQ feedback timing indicator – [3] bits The DCI for non-fallback for scheduling PDSCH may include, for example, the following information.

TABLE 6-1

- Carrier indicator – 0 or 3 bits
- ID for DCI format – [1] bit
- Bandwidth part indicator – 0, 1, or 2 bits
- Frequency domain resource allocation type 1,
  With respect to resource allocation type 0, $[N_{RB}^{DL,BWP}/P]$-bits
  With respect to resource allocation type 1, $[[\log_2(N_{RB}^{DL,BWP}(N_{RB}^{DL,BWP}+1)/2)]]$-bits
- Time domain resource allocation – 1, 2, 3, or 4 bits
- Mapping between VRB and PRB – 0 or 1 bits, only for resource allocation type 1
  When only resource allocation type 0 is configured, 0 bits
  In other cases, 1 bit
- PRB bundling size indicator – 1 bit
- Rate matching indicator – 0, 1, 2 bits
- ZP CSI-RS trigger – X bits
  With respect to transmission block 1;
- Modulation and coding scheme – 5 bits
- New data indicator – 1 bit
- Redundancy version – 2 bits

TABLE 6-2

With respect to transmission block 2
  – Modulation and coding scheme – 5 bits
  – New data indicator – 1 bit
  – Redundancy version – 2 bits
  – HARQ process number – 4 bits
  – Downlink allocation index – 0 or 4 bits
  – TPC command for scheduled PUCCH – 2 bits
  – PUCCH resource indicator
  – PDSCH vs HARQ feedback timing indicator – 3 bits
  – Antenna ports – 5 bits or more
  – Transmission configuration indicator – 3 bits
  – CBG transmission information – 0, 2, 4, 6, or 8 bits
  – CBG flushing out information – 0 or 1 bit
  – DMRS sequence initial configuration – 0 or 1 bit The DCI may be subjected to a channel coding and modulation process and may be transmitted through a physical downlink control channel (PDCCH), which is a downlink physical control channel. A cyclic redundancy check (CRC) is attached to the DCI message payload, and the CRC is scrambled with a radio network temporary identifier (RNTI) corresponding to the identity of the UE.

In the DCI, different RNTIs are used according to the purpose of the message, for example, UE-specific data transmission, a power control command, or a random access response. That is, the RNTI is not explicitly transmitted, but included in a CRC calculation process and transmitted. Upon receiving the DCI message transmitted on the PDCCH, the UE may identify the CRC using the assigned RNTI, and w % ben the CRC identification result is correct, it can be known that the corresponding message has been transmitted to the UE.

For example, DCI scheduling a PDSCH for system information (SI) may be scrambled with SI-RNTI. DCI scheduling a PDSCH for a random access response (RAR) message may be scrambled with an RA-RNTI. DCI scheduling a PDSCH for a paging message may be scrambled with P-RNTI. DCI notifying a slot format indicator (SFI) may be scrambled with SFI-RNTI. DCI notifying transmit power control (TPC) may be scrambled with TPC-RNTI. DCI for scheduling a UE-specific PDSCH or PUSCH may be scrambled with Cell RNTI (C-RNTI).

When a specific UE receives a data channel, that is, a PUSCH or a PDSCH scheduled through the PDCCH, data is transmitted and received along with the DMRS in the corresponding scheduled resource region.

Figure 5:
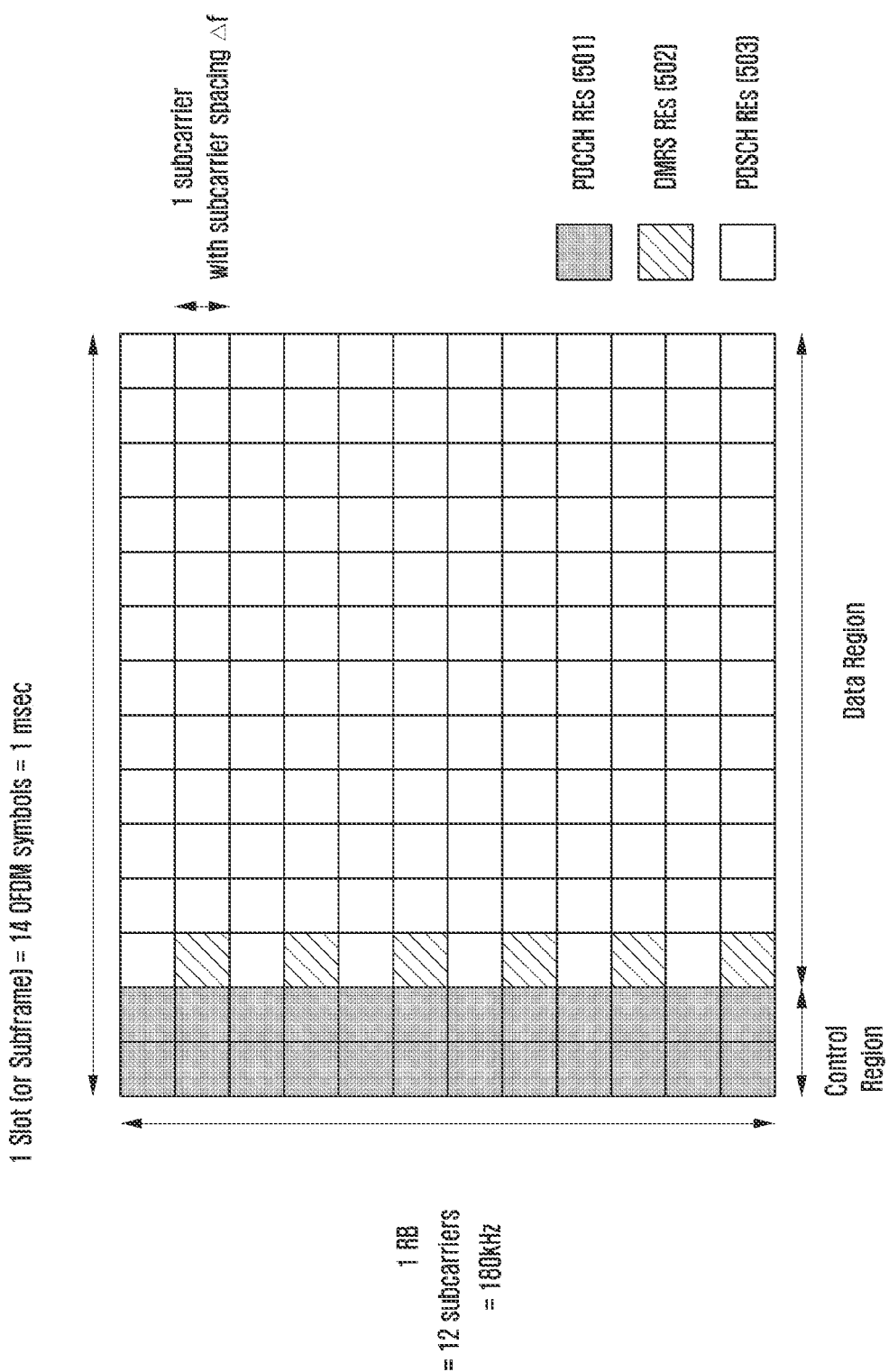
FIG. 5 is a diagram illustrating an example of a configuration for a downlink RB structure in 5G.

FIG. 5 illustrates a case in which a specific UE uses 14 OFDM symbols as one slot (or subframe) in downlink, a PDCCH is configured to be transmitted in the first two OFDM symbols, and a DMRS is configured to be transmitted in the third symbol. In the case of FIG. 5, within a specific RB in which the PDSCH is scheduled, the PDSCH is transmitted by mapping data to REs for which DMRS is not transmitted in the third symbol and REs from the fourth to the last symbol. A subcarrier spacing $\Delta f$ expressed in FIG. 5 is 15 kHz for ab LTE/LTE-A system and one of {5, 30, 60, 120, 240, 480} kHz is used for a 5G system.

Meanwhile, as described above, in order to measure a downlink channel state in a cellular system, a base station needs to transmit a reference signal. In the case of 3GPP's long term evolution advanced (LTE-A) system, the UE may measure the channel state between the base station and the UE using CRS or CSI-RS transmitted by the base station.

The channel state should be measured in consideration of various factors, which may include an amount of interference in downlink. The amount of interference in the downlink includes an interference signal and thermal noise generated by an antenna belonging to an adjacent base station, and the amount of interference in the downlink is important for the UE to determine the downlink channel condition. For example, when a signal is transmitted from a transmission antenna of a single personal base station to a reception antenna of a single personal UE, the UE needs to determine Es/Io by determining energy per symbol that can be received in downlink from the reference signal received from the base station and the amount of interference to be simultaneously received in an interval for receiving the corresponding symbol. The determined Es/Io may be converted into a data transmission rate or a value corresponding thereto and may be transmitted to the base station in the form of a channel quality indicator (CQI). The Es/Io may be used to determine at which data transmission rate the base station will transmit to the UE.

In the case of the LTE-A system, the UE feeds back information on the downlink channel state to the base station so that the fed back information can be utilized for downlink scheduling of the base station. That is, the UE measures a reference signal transmitted by the base station in downlink, and feeds back information extracted from the measured signal to the base station in a form defined by the LTE/LTE-A standard. As described above, the information fed back by the UE in the LTE/LTE-A may be referred to as channel state information, and the channel state information may include the following three pieces of information.

Rank indicator (RI); Number of spatial layers that UE can receive in current channel state Precoding matrix indicator (PMI); Indicator for precoding matrix preferred by UE in current channel state Channel quality indicator (CQI); Maximum data rate that UE can receive in current channel state The CQI may be replaced with a signal to interference plus noise ratio (SINR) that can be utilized similarly to the maximum data rate, the maximum error correction code rate and modulation method, data efficiency per frequency, etc.

The RI, PMI, and CQI are related to each other and have meaning. For example, a precoding matrix supported by LTE/LTE-A is defined differently for each rank. Therefore, a PMI value X when RI has a value of 1 and a PMI value X when RI has a value of 2 may be interpreted differently. Also, when the UE determines the CQI, it is assumed that the PMI and X notified to the base station by the UE are applied in the base station. That is, the fact that the UE reports RI_X, PMI_Y, and CQI_Z to the base station is the same as the fact that the corresponding UE can receive a data rate corresponding to CQI_Z when a rank is RI_X and PMI is PMI_Y. In this way, the UE may assume which transmission method to be performed on the base station when calculating the CQI, so that optimized performance can be obtained when actual transmission is performed using the corresponding transmission method.

In LTE/LTE-A, RI, PMI, and CQI, which are channel state information fed back by the UE, may be fed back in a periodic or aperiodic form. When the base station intends to aperiodically acquire channel state information of a specific UE, the base station may configure to perform aperiodic feedback (or aperiodic feedback channel state information report) using an aperiodic feedback indicator (or a channel state information request field or channel state information request information) included in downlink control information (DCI) for the UE.

In addition, when the UE receives an indicator configured to perform aperiodic feedback in an n-th subframe, the UE may perform uplink transmission including aperiodic feedback information (or channel state information) in data transmission in an (n+k)-th subframe. Here, k is a parameter defined in 3GPP LTE Release 11 standard, which is 4 in frequency division duplexing (FDD), and may be defined as in Table 7 in time division duplexing (TDD).

TABLE 7 k value for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When aperiodic feedback is configured, feedback information (or channel state information) includes RI, PMI, and CQI, and the RI and PMI may not be fed back according to feedback configuration (or channel state report configuration).

An in-band full duplex (hereinafter, referred to as full duplex) system, which is a different from time division transmission/reception (TDD) or a frequency division duplexing (FDD) system, is a system in which an uplink signal and a downlink signal of the same cell are simultaneously transmitted within the same band and the same time resource. That is, in the full-duplex system, uplink and downlink signals exist in the same cell, which acts as interference.

The type of interference that appears additionally due to the use of a full-duplex system is classified into two types: self-interference and cross-link interference.

Self-interference refers to interference received from the base station's own downlink transmission received in the same band when the base station receives the UE's uplink and interference received from the UE's own uplink transmission when downlink is received in a case in which the UE has a full-duplex operation function. The self-interference significantly reduces a signal to interference and noise ratio (SINR) of the desired signal because transmission and reception occur at a closer distance than a desired signal. Therefore, the transmission performance of the full-duplex system is greatly affected by the performance of self-interference cancellation technique.

Cross-interference refers to interference received from downlink transmission of another base station received in the same band when the base station receives the uplink of the UE, and interference received from uplink transmission from another UE when the UE receives a downlink. In the case of cross-interference that a base station receiving an uplink signal receives from downlink transmission of another base station, a distance between an interference transmitting end and an interference receiving end is greater than a distance between a UE transmitting a request signal of the base station and a receiving end of the base station, but the interference transmission power is generally equal to or greater than 10 to 20 dB compared to the transmission power of the UE, so that it may significantly affect the reception SINR performance of an uplink desired signal of the UE received by the base station.

In addition, the UE receiving the downlink may receive cross-interference from another UE using the uplink in the same band. In this case, when a distance between the UE causing interference and the UE receiving the downlink is meaningfully closer than a distance between the base station and the UE receiving the downlink, the downlink desired signal reception SINR performance of the UE may be lowered. In this case, the case of being meaningfully closer means a state in which the corresponding two UEs are close enough to lower the performance of downlink reception SINR of the UE.

In a cellular-based mobile communication system, the type of the full-duplex system is divided into a type in which only the base station supports self-interference cancellation for supporting a full-duplex operation and a type in which both the base station and the UE support the self-interference cancellation. The reason for not considering the case where only the UE has an interference cancellation function is that the implementation of antenna separation self-interference cancellation, RF-circuit self-interference cancellation, and digital self-interference cancellation functions can be easily performed in the base station rather than the UE in terms of form factor, size, circuit structure, etc.

The type of the full-duplex system considered in the disclosure fundamentally considers the case where only the base station has the self-interference cancellation function, but is not limited thereto. The disclosure can be equally applied and operated even when both the UE and the base station have the self-interference cancellation function.

Figure 6:
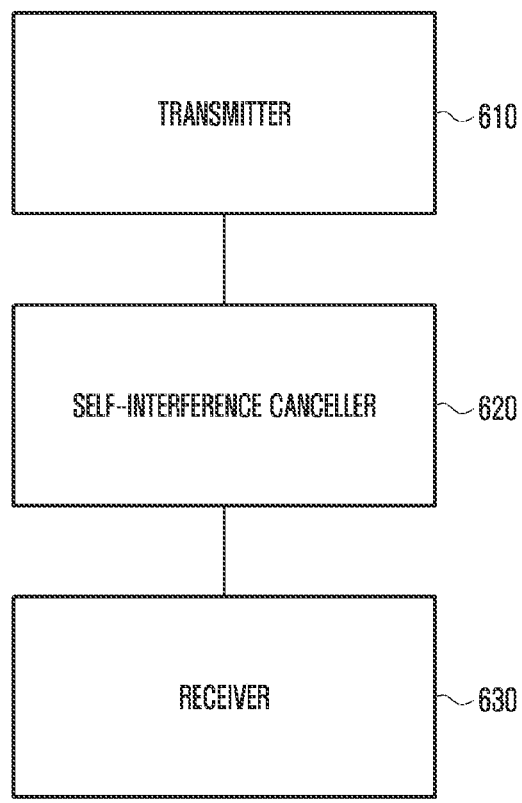
FIG. 6 is a diagram illustrating a basic structure of a transceiver of a full-duplex system.

FIG. 6 illustrates a transceiver having a self-interference cancellation function, which is a major component of a full-duplex system. In this case, the structure of the transceiver is equally applicable to a base station and a UE, and only one structure of the base station and the UE is not specified. However, in the disclosure, since it is fundamentally assumed that the base station has a self-interference cancellation function and constitutes a full-duplex system, it is assumed that the transceiver is a base station for convenience of description and description thereof will be made.

In FIG. 6, the base station is composed of a transmitter 610 for transmitting a downlink signal to the UE, a self-interference canceller 620 for self-interference cancellation, and a receiver 630 for receiving an uplink signal from the UE. In this case, the detailed configuration method of each component varies depending on the implementation method of the base station.

Figure 7:
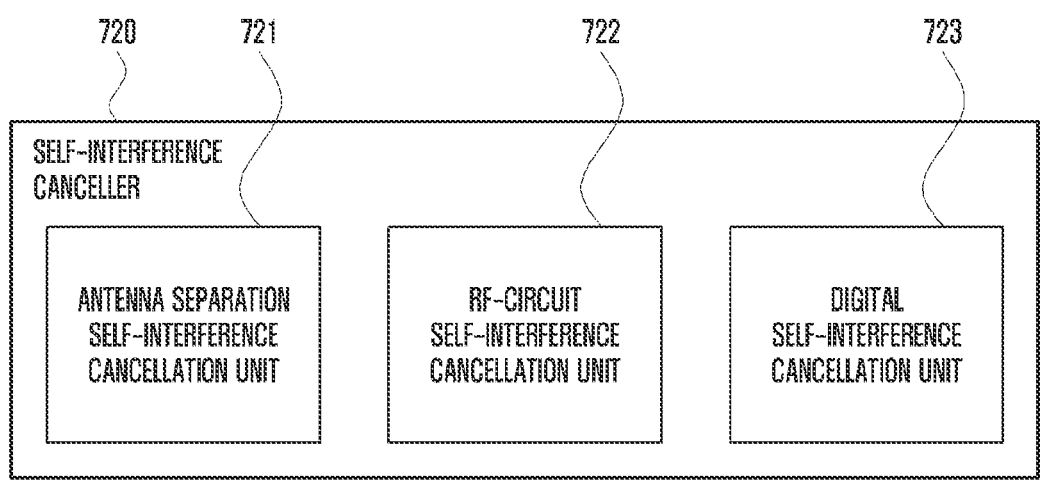
FIG. 7 is a diagram illustrating a self-interference cancellation unit of a transceiver of a full duplex system.

FIG. 7 illustrates an example of the self-interference canceller used for self-interference cancellation. The self-interference canceller 720 of FIG. 7 includes three units: an antenna separation self-interference cancellation unit 721, an RF-circuit self-interference cancellation unit 722, and a digital self-interference cancellation unit 723, respectively. The role of each unit is as follows.

First, the antenna self-interference cancellation unit 721 is a device that allows self-interference to be sufficiently attenuated and received on the receiving side of the base station through physical separation of antennas of the transmitting end and the receiving end of the base station. In this case, the physical separation means separation using a separation method using destructive interference of an antenna, a method using a circulator in the same antenna, a method using a cross pole structure, a method using an isolator, and the like so that the downlink transmission signal of the base station is less received at the uplink receiving end of the base station.

In addition, the RF-circuit self-interference cancellation unit 722 serves to attenuate the signal strength before the self-interference signal is quantized by an analog to digital converter (ADC). The RF-circuit of the self-interference cancellation unit simulates a channel experienced by a self-interference signal transmitted from the transmitting end of the base station, passing through a radio channel and the antenna self-interference cancellation unit, and arriving at the RF-circuit self-interference cancellation unit.

For example, with respect to an analog domain transmission signal x(t) of a base station, a received signal y(t) passing through the antenna self-interference cancellation unit and the radio channel can be expressed by the following Equation (1).

$$y(t)=x(t)*h(t)+n(t) \quad \text{Equation (1)}$$

In the above Equation, h(t) represents a time domain impulse response of the radio channel and antenna self-interference cancellation unit, and n(t) represents white noise. At this time, the RF-circuit of the RF-circuit self-interference cancellation unit generates a pseudo-channel h'(t) obtained by simulating h(t) using a time delay module, a phase shift module, and an amplifier module. After that, a transmission signal x(t) obtained from the transmitting end is passed through the RF-circuit to simulate the self-interference signal. Afterwards, a minus sign is added to the self-interference signal, which serves to attenuate the self-interference signal as a result of Equation (2) below.

$$y'(t)=x(t)*h(t)-x(t)*h'(t)+n(t) \quad \text{Equation (2)}$$

In this case, a bandwidth at which the performance of the RF-circuit self-interference cancellation unit is maintained varies according to the bandwidth of the above-described components of the RF-circuit, for example, the time delay module, the phase shift module, and the amplifier module. For example, when the bandwidth at which the performance of the self-interference cancellation unit of the RF-circuit is maintained is smaller than the system bandwidth, the bandwidth limitation of the self-interference cancellation unit is due to the limitation of an analog circuit.

Finally, the digital self-interference cancellation unit 723 serves to remove a self-interference signal X[n] from a reception signal Y[n] obtained such that a signal y'(t) passed through the RF self-interference unit is converted into a frequency domain after passing through an ADC. For example, as in Equation (3) below, a digital domain channel H[n] experienced by the transmission signal X[n] is estimated, and this is subtracted from the reception signal Y[n].

At this time, the performance of the digital self-interference cancellation unit is determined by similarity between an estimated channel H'[n] and an actual channel H[n]. That is, the higher the similarity between H'[n] and H[n], the higher the performance of the digital self-interference cancellation unit.

$$Y'[n]=X[n]H[n]-X[n]H'[n]+n(t) \quad \text{Equation (3)}$$

Hereinafter, an embodiment of the disclosure will be described in detail with reference to the accompanying drawings. Hereinafter, an embodiment of the disclosure will be described using an LTE or LTE-A system as an example, but the embodiment of the disclosure may be applied to other communication systems having a similar technical background or channel type. For example, 5G mobile communication technology (5G, new radio, or NR) developed after LTE-A may be included in this. Accordingly, the embodiments of the disclosure may be applied to other communication systems through some modifications within the scope of the disclosure as judged by a person having skilled technical knowledge.

In addition, in the description of the disclosure, if it is determined that a detailed description of a related function or configuration may unnecessarily obscure the gist of the disclosure, the detailed description thereof will be omitted. In addition, the terms described below are terms defined in consideration of functions in the disclosure, which may vary according to intentions or customs of users and operators. Therefore, the definition should be made based on the content throughout this specification.

Figure 8:
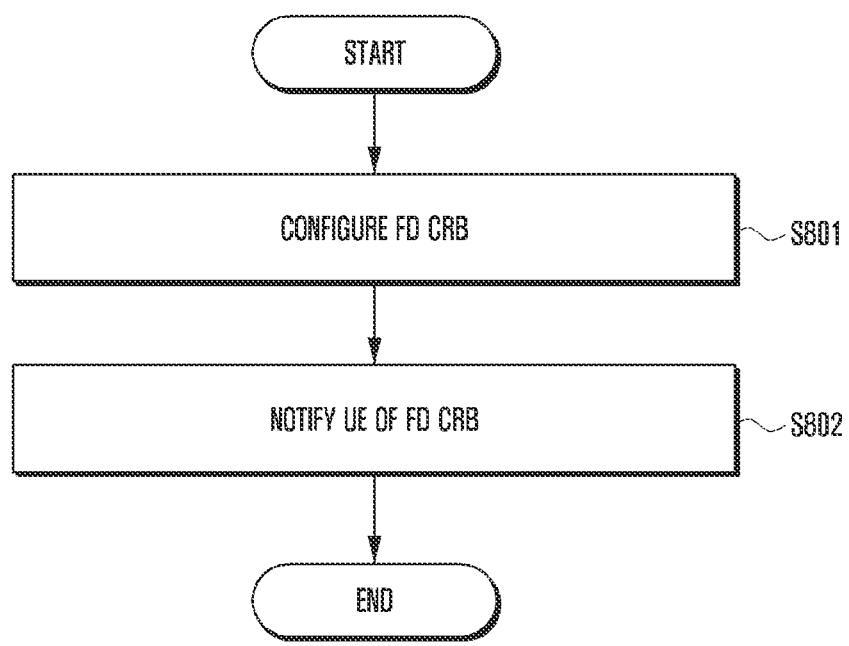
FIG. 8 is a diagram illustrating a basic operation of a base station according to an embodiment of the disclosure.

FIG. 8 is a flowchart illustrating the concept of the operation of a base station proposed in the disclosure. This operation represents a series of processes in which the base station configures an FD CRB and notifies a UE thereof.

In this case, a full duplex (FD) common resource block (CRB) refers to a region in which a base station can perform an FD operation among CRBs in which a band usable by the base station is divided into predetermined units. In the disclosure, the CRB means that a bandwidth in which each base station operates is divided into RB units and numbered.

In addition, the physical resource block (PRB) means that a band allocated to the UE, not the base station, is divided into RB units and numbered. In this case, the base station and the UE may communicate through a CRB or PRB number, respectively, and the PRB of one UE corresponds to the CRB of the base station one-to-one. Therefore, the mapping between the CRB and the PRB only is changed depending on a difference in viewpoint, and the application to the CRB and the application to the PRB can be easily induced based on the contents of the disclosure.

Referring to FIG. 8, the base station according to an embodiment of the disclosure may configure an FD CRB in operation S801. In FIG. 8, configuring the FD CRB means that when the base station supports an FD function, a frequency part capable of actually performing the FD operation is distinguished.

More specifically, in order to support the FD function, a self-interference cancellation (SIC) operation described above must be performed in the base station. Due to the limitations of the analog component of the RF SIC, an SIC gain in which only a part of the entire operation area can perform the FD operation can be obtained. In this case, the FD CRB may mean defining a CRB capable of performing the FD operation at a meaningful level (e.g., a degree to which the SIC gain can be obtained) among all CRBs of the base station.

The FD CRB is arbitrarily configured by the base station and may be determined due to the operational capability of the base station. However, the FD CRB may be reconfigured due to changes in the channel environment, etc., and the same operation as before may be performed by updating the list after the FD CRB is reconfigured.

When the FD CRB is configured in this way, the base station according to an embodiment of the disclosure may notify the UE of the configured FD CRB in operation S802.

In FIG. 8, the operation of notifying the UE of the FD CRB may include, for example, an operation of transmitting a list of the CRB secured through the FD CRB configuration to the UE. A method of transmitting the list of the CRB to the UE may use a broadcasting method transmitted to all UEs in a cell in general, but multi-casting method in which the list of the CRB is transmitted to UEs considering a specific FD operation or a unicasting method in which the list of the CRB is transmitted only to a specific UE may also be considered.

In the operation of notifying the UE of the FD CRB, for example, as to the form of the FD CRB list generated by the base station, the same method of notifying a specific RB list between the existing UE and the base station may be applied. For example, when a method used by the base station to schedule a specific RB to the UE is used, a method of indicating whether all CRBs are FD CRBs or HD CRBs using a bitmap structure, a method of notifying the start and end points of the FD CRB among CRBs, etc., may be used for the operation of notifying the FD CRB. Alternatively, the base station may transmit information on the configured FD CRB to the UE by using a method of notifying only a part of an area used as the FD CRB from the operation area of the UE or a method of indicating the FD CRB area again during scheduling. However, the gist of the disclosure is that the base station notifies the UE of the FD CRB, not the differentiation of the method of notifying the FD CRB.

Figure 9:
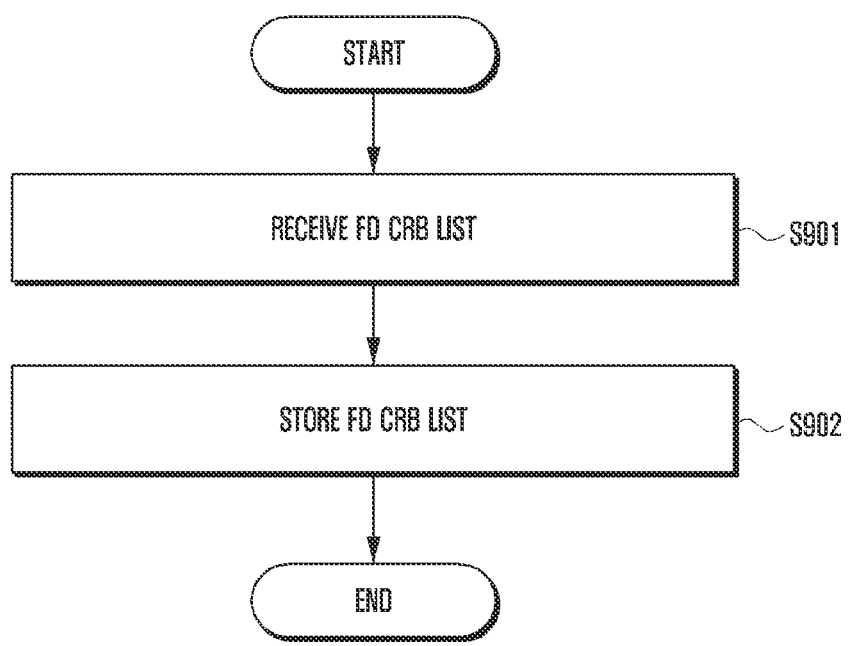
FIG. 9 is a diagram illustrating a basic operation of a UE according to an embodiment of the disclosure.

FIG. 9 is a flowchart illustrating the concept of an FD RB list reception operation of a UE proposed by the disclosure. This operation includes an operation of receiving the list of the FD CRB configured by the base station in operation S910, and an operation of storing the received list in operation S920.

Referring to FIG. 9, a UE according to an embodiment of the disclosure may receive a list of the FD CRB from a base station in operation S901. As such, the operation of receiving the list of the FD CRB corresponds to the operation of notifying the FD CRB by the base station described in FIG. 8, and means an operation in which the UE receives a signal transmitted from the base station, interprets the received signal, and secures the list of the FD CRB.

In this case, the FD CRB list may be transmitted using the above-described method or a method of indicating commonly allocated resources in a mobile communication system, and the transmission method may be defined through an agreement between the base station and the UE. In addition, it should be considered that the list of the RB performing the FD operation may be informed in a PRB layer allocated to the UE, rather than in units of CRBs. This may also be defined by a prior agreement or protocol between the base station and the UE.

In this way, when the list of the FD CRB is received from the base station, the UE according to an embodiment of the disclosure may store the received list in operation S902. The operation of storing the FD CRB list in FIG. 9 means storing FD CRB information transmitted to the UE. Based on this, when the operating band of the UE is allocated from the base station, an operation of identifying whether the operating band of the UE is included in the FD band is performed by comparing the allocated RB with the stored FD CRB.

Figure 10:
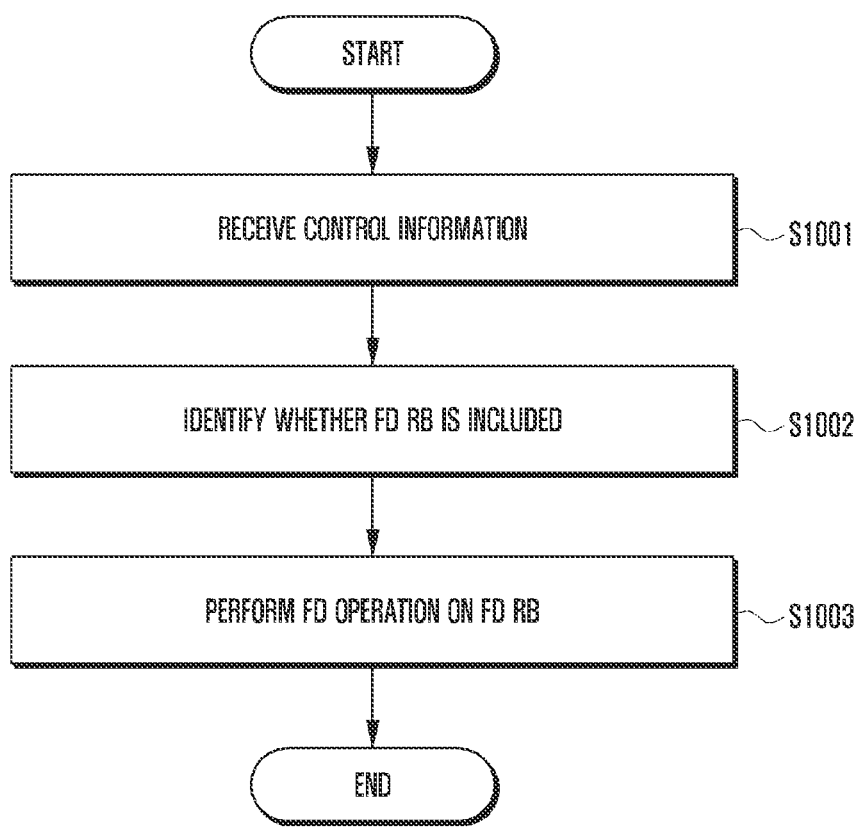
FIG. 10 is a diagram illustrating a reception operation of a UE according to an embodiment of the disclosure.

FIG. 10 is a flowchart illustrating the concept of a data reception process of a UE proposed in the disclosure. In this operation, the UE receives control information for data reception and transmission from the base station in operation S1001, decodes the received control information and identifies whether the FD RB is included in a scheduled RB in operation S1002, and performs an FD-specific operation with respect to the FD RB in operation S1003.

Referring to FIG. 10, the UE according to an embodiment of the disclosure may receive control information from the base station in operation S1001. The fact that the UE receives control information in FIG. 10 may mean that the UE receives information about resources to be transmitted and received from the base station and a transmission method. For example, as a process in which the UE receives information for scheduling PDSCH or PUSCH from the base station, the base station notifies the UE of the resource used for transmission or reception by the UE through this process. At this time, the UE may be aware of the control information for the RB actually used.

In this way, upon receiving the control information from the base station, the UE according to an embodiment of the disclosure may identify whether an RB included in a pre-determined FD RB based on the control information in operation S1002. In FIG. 10, the operation of identifying whether the FD RB is included in the RB may mean identifying whether the FD RB is included in the operation area of the UE, using RB allocation information received in the operation of receiving the control information in operation S1001, and the CRB list secured through the operation of receiving the FD CRB list in operation 901 and the operation of storing the FD CRB list in operation S902 in FIG. 9. For example, the previously obtained FD CRB list is mapped to the PRB received by the UE, and is then converted into an FD PRB list. Thereafter, the PRB number of the actually scheduled RB is compared with the list of the FD PRB, the PRB existing in both is configured as the scheduled FD RB, and the remaining scheduled PRB other than the PRB configured as the FD RB is configured as a half-duplex (HD) RB.

In this way, when the FD RB is configured, the UE according to an embodiment of the disclosure may perform an FD operation on the configured FD RB in operation S1003. Here, performing the FD operation may mean performing the FD operation on the FD RB secured through the operation of receiving the control information in operation S1001 and identifying whether the FD RB is included in the RB in operation S1002. Here, the FD operation means that the UE or the base station performs an operation differentiated from the existing HD RB for the FD RB. In the following embodiments, some embodiments of this FD operation will be described.

The operations of FIGS. 8, 9, and 10 described above are for an embodiment of a process in which the base station provides the FD CRB list to the UE in advance, and the UE analyzes the FD CRB list again to confirm the FD RB. In addition, the UE may secure the FD RB list through a method of notifying the FD RB directly from the base station to the UE. For example, for the FD RB, there may be a method of notifying the FD RB by transmitting DCI for FD RB notification after/before the PDSCH or PUSCH allocation.

The main gist of the disclosure is to secure the FD RB list through the above process and perform other operations on the FD RB. Therefore, the value of the disclosure will lie in the overall operation process rather than a detailed method for securing the FD RB list or a specific method for the FD RB.

Hereinafter, embodiments of the specific operation of the disclosure described with reference to FIGS. 8, 9, and 10 will be described. However, each embodiment shows only some examples that can be derived from the disclosure, and more specific operation methods may be derived from FIGS. 8, 9, and 10, which are the main operations of the disclosure.

First Embodiment

The following embodiment shows a process in which the UE identifies the control information from the PDCCH and the UE identifies whether the FD RB is included in the scheduled RB.

Figure 11:
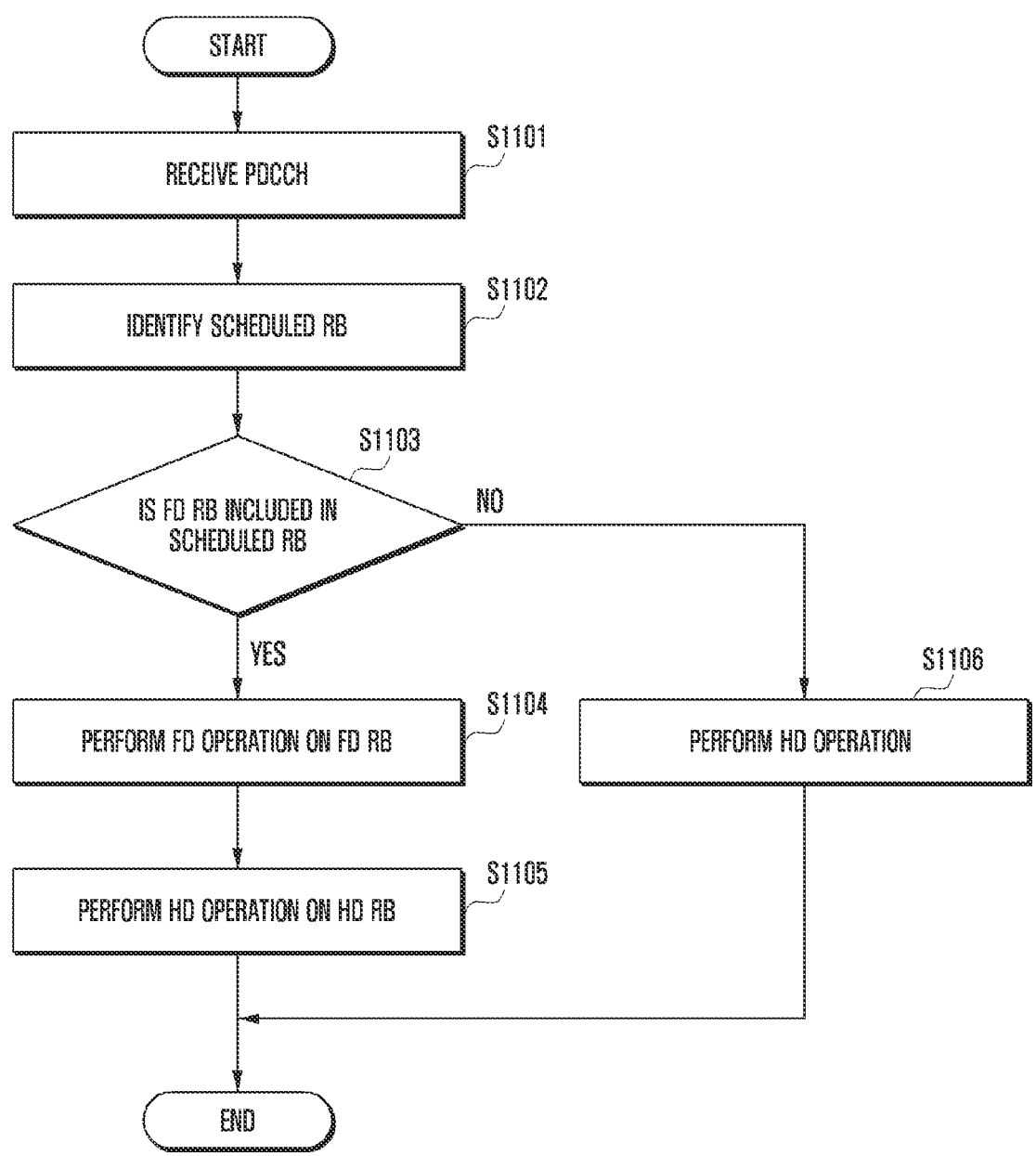
FIG. 11 is a diagram illustrating a reception operation of a UE according to a first embodiment of the disclosure.

FIG. 11 illustrates a series of processes in which a UE receives a PDCCH transmitting a control signal, decodes the received PDCCH, identifies a scheduled RB, determines whether an FD RB is included in the RB scheduled for the UE, and then performs an FD operation on the FD RB and performs an HD operation on the remaining RBs.

Referring to FIG. 11, a UE according to an embodiment of the disclosure may receive a PDCCH from a base station in operation S1101. Here, the operation of receiving the PDCCH refers to decoding information including an RB position of the PDSCH used by the UE when the UE receives downlink, a modulation and coding scheme (MCS), and the like, or information including an RB position of the PUSCH used by the UE when the UE transmits the uplink and an MCS. Accordingly, through this process, the UE identifies the RB scheduled for the UE.

Here, scheduling has the following meaning. The UE operates by being allocated some of bands used by the base station in units of RBs, as an operation area (bandwidth part). In this case, the UE does not always receive downlink data or transmits uplink data in the operation area, but performs transmission/reception operations at a time point designated by the base station and a designated resource. Therefore, in the disclosure, scheduling is defined as a base station designating a resource for reception or transmission within the operation area of the UE to the UE.

In this way, when decoding on the PDCCH is performed, the UE according to an embodiment of the disclosure can identify an RB scheduled for the UE in operation S1102. A process in which the UE identifies the scheduled RB in FIG. 11 may be a process of identifying the RB obtained by decoding the PDCCH.

Through this process, the UE according to an embodiment of the disclosure may identify whether an FD RB is included in the RBs scheduled to the UE in operation in S1103.

At this time, as described above, there are two major methods for identifying whether the FD RB is included in the RBs. In the first method, the base station notifies the UE of the FD CRB in advance, the UE converts the FD CRB to a PRB allocated to the UE to store the location of the FD RB, and then the location of the actually scheduled RB is compared with the location of the stored FD RB. In the second method, the base station notifies the UE whether the FD RB is included in the RBs whenever the base station schedules the RB and notifies the location of the FD RB. The fundamental difference between the two methods is whether the base station notifies the UE of whether the FD RB is included in the RBs before the time when the RB is scheduled to the UE, or whether the base station notifies the UE of the same at the same time as or later than the time when the RB is scheduled to the UE.

For example, when the FD RB is included in the RB scheduled to the UE, the UE performs an FD operation on the scheduled FD RB.

The FD operation with respect to the FD RB will be briefly described as follows. For example, in a case in which a UE receives a downlink, when the UE receives the downlink through the FD RB, the UE receives inter-UE cross-interference from another UE. Here, the inter-UE cross-interference may be first decoded and then a cancellation operation may be performed. In this way, it is possible to alleviate performance degradation caused by cross-interference experienced by the UE. In addition, in the case of the FD RB, reception interference may be higher than that of the HD RB due to other cross-interference, self-interference, and the like. In this case, a differentiated operation such as allocating a lower MCS than the HD RB is required for the FD RB. A more detailed differentiated operation for the FD RB of the UE will be described in more detail in the following embodiments.

The case in which the FD RB is included in the RB scheduled to the UE may be largely classified into two types. The first corresponds to a case in which all RBs scheduled to the UE are FD RBs, and the second corresponds to a case in which some of the RBs scheduled to the UE are FD RBs and some are HD RBs. In this case, when only the FD RB is scheduled, the UE only needs to perform an operation specific to the FD for all the scheduled RBs in operation S1104. Unlike to this, when the UE is allocated for some FD RBs and some HD RBs, the UE performs an FD RB-specific operation with respect to the FD RB in operation S1104, and performs an HD RB-specific operation for the HD RB in operation S1105. The point here is that the UE performs separate operations with respect to the FD RB and the HD RB.

As another example, when the FD RB is not included in the RB scheduled to the UE, the UE performs an HD operation on the RB scheduled to the UE in operation S1106.

Second Embodiment

In the second embodiment, an example of an operation method of a UE according to a configuration type of an operation area (bandwidth part) of the UE will be described.

The operation of the first embodiment described above is performed when the operation area allocated to the UE partially includes or is likely to include the FD RB. Based on this, in this embodiment, a method of switching the operation of the UE so that the operation of the first embodiment is performed according to the presence or absence of the FD RB in the operation area allocated to the UE will be described.

Figure 12:
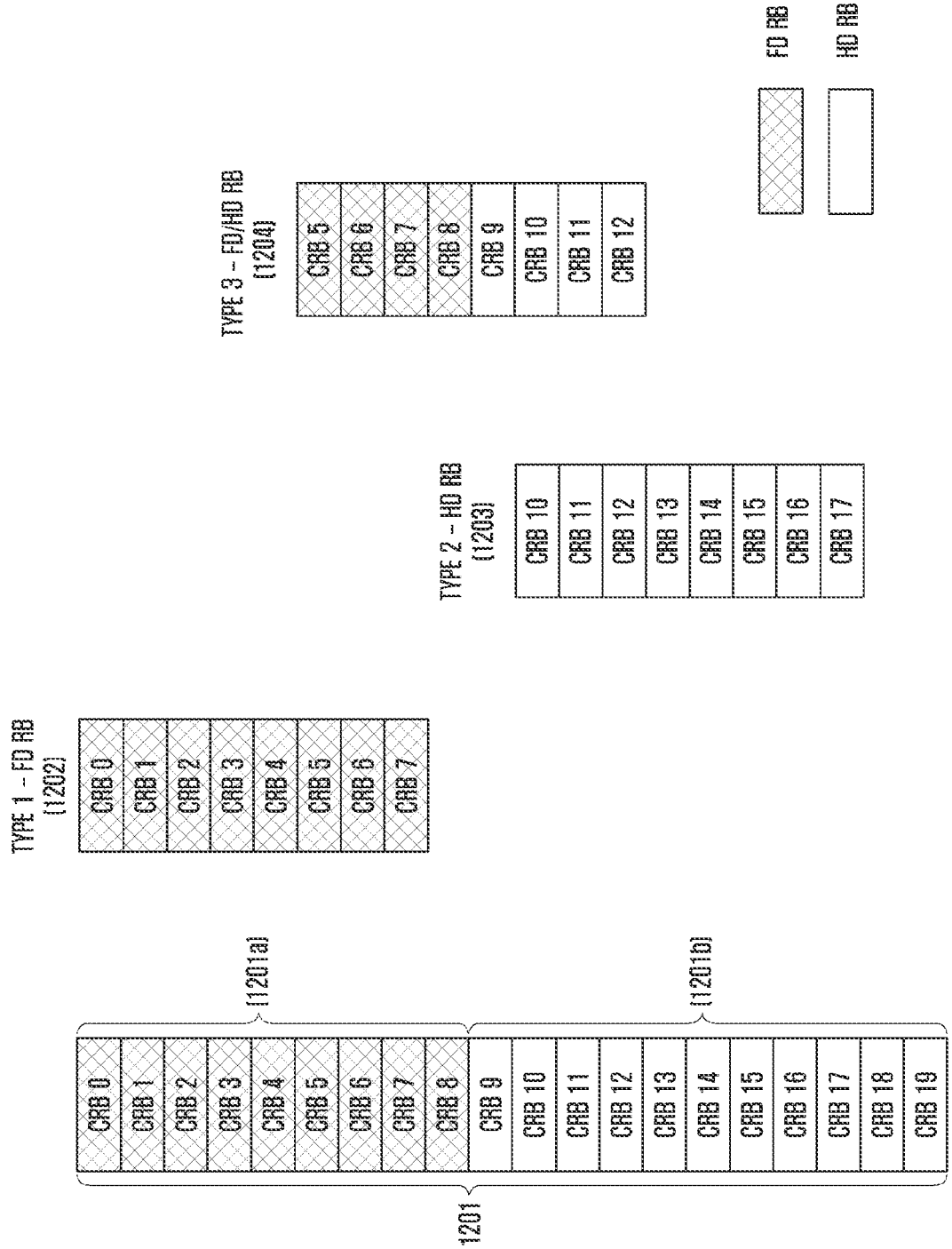
FIG. 12 is a diagram illustrating an RB allocation type of a UE according to a second embodiment of the disclosure.

FIG. 12 illustrates an example for explaining the type of resource of the operation area allocated to the UE when some of CRBs operated by the base station are FD CRBs. In this example, numerical values such as the number of FD RBs, the total number of RBs of the base station, and the number of RBs allocated to the UE do not have any meaning, and are arbitrarily selected to constitute one example.

In this example, the base station operates in a total of 20 RB 1201 areas, of which 9 RBs are FD RBs (CRB #0 to CRB #8) capable of FD operation in 1201a, and the remaining RBs (CRB #9 to #19) are HD RBs that cannot perform the FD operation in 1201b.

In FIG. 12, there are mainly three types of operation area resource allocation of the UE.

First, a first type 1202 is a case in which the base station according to an embodiment of the disclosure allocates only the FD RB to the operation area of the UE. In this case, it is known that the resource is always an FD RB. Accordingly, the UE may operate under the assumption that all scheduled RBs are FD RBs.

A second type 1203 in FIG. 12 is a case in which the base station according to an embodiment of the disclosure allocates only the HD RB to the operation area of the UE. In this case, since the UE can always receive only the HD resource scheduled, the UE always performs only the HD operation.

A third type 1204 in FIG. 12 is a case in which the base station according to an embodiment of the disclosure simultaneously allocates the FD RBs to some of the operation area of the UE and allocates the HD RBs to some thereof at the same time. In this case, the UE determines the operation type of the UE for each duplex mode of the RB configured according to the first embodiment. When the FD RB and the HD RB are simultaneously scheduled, the UE operates the FD RB and the HD RB in parallel.

Figure 13:
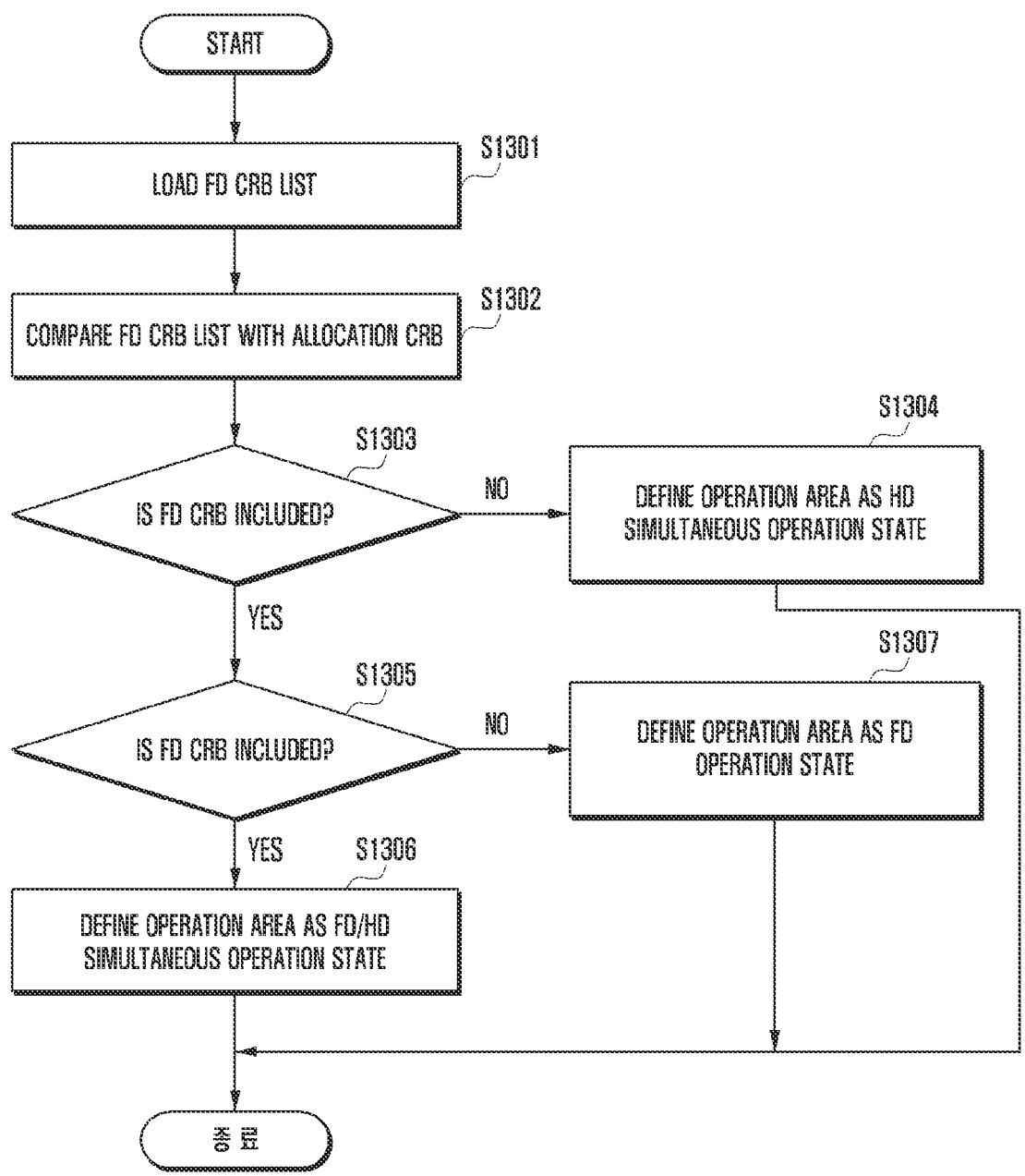
FIG. 13 is a diagram illustrating an operation type change of a UE according to a second embodiment of the disclosure.

FIG. 13 is a flowchart illustrating an example of an operation performed by a UE to determine an operation area.

This operation may be performed whenever the UE is allocated a new operation area from the base station. In this example, it is assumed that the UE has received and stored an FD CRB list from the base station, and the operation time of this example is after the UE is allocated the operation area from the base station.

Referring to FIG. 13, in operation S1301, the UE according to an embodiment of the disclosure loads the FD CRB list stored after being transmitted from the base station. Next, in operation S1302, the UE according to an embodiment of the disclosure compares the loaded FD CRB list with a CRB allocated from the base station. Next, in operation 1303, the UE according to an embodiment of the disclosure identifies whether the FD RB is included in the operation area previously allocated from the base station.

For example, when the FD CRB is not included in the FD CRB list, in operation S1304, the UE determines the operation area as an HD operation area. On the contrary, when the FD CRB is included in the FD CRB list, in operation S1305, the UE identifies whether an HD RB is included in the operation area. In this case, when the HD RB is included in the operation area, in operation S1306, the UE defines the operation area as a state in which FD/HD can be simultaneously operated. On the other hand, when the HD RB is not included in the operation area, in operation S1307, the UE defines the operation area as an FD operation state.

In addition to the example of FIG. 13, when the base station designates the operation area to the UE, the operation area may be determined by explicitly notifying the operation type.

Figure 14:
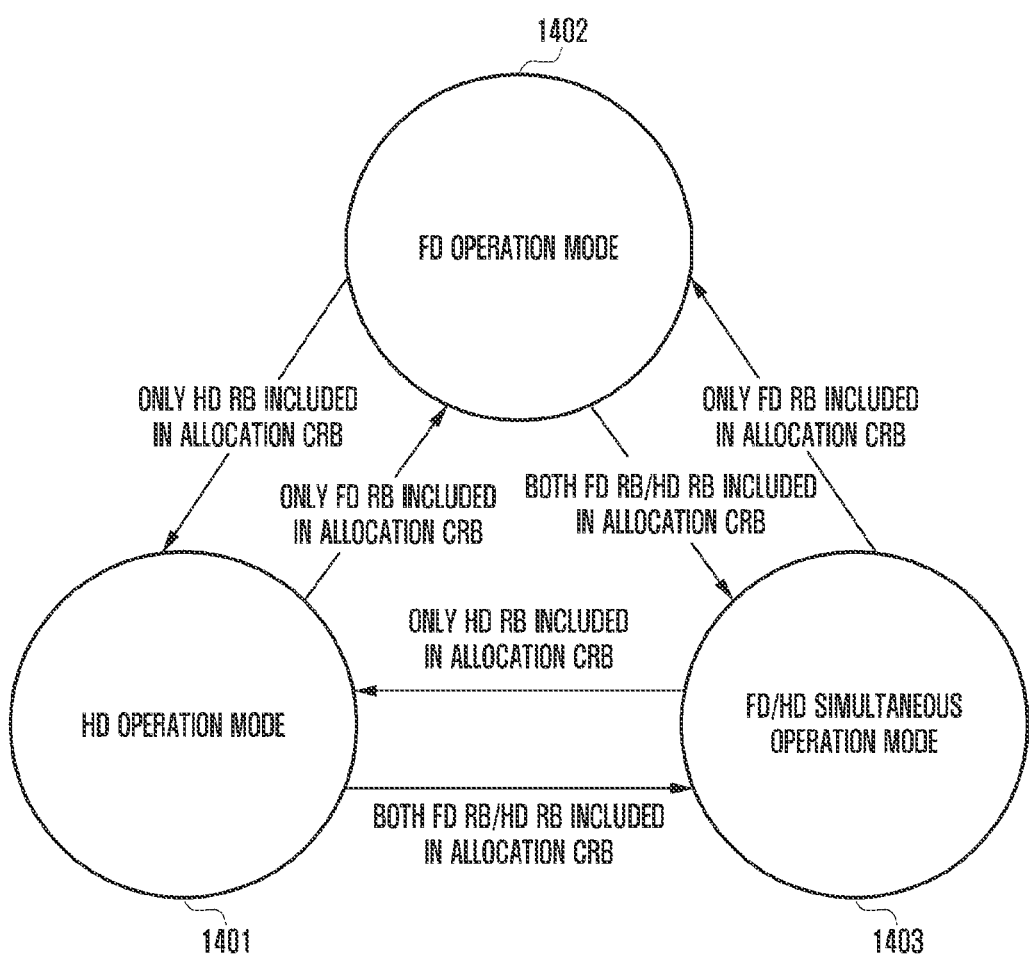
FIG. 14 is a diagram illustrating an operation type state of a UE according to a second embodiment of the disclosure.

FIG. 14 is a diagram illustrating a state according to the operation area allocation of the UE.

The UE operates in an HD operation mode 1401 when the operation area allocated from the base station is all composed of HD RBs, operates in an FD operation mode 1402 when the operation area is composed of only the FD RBs, and is switched to an FD/HD simultaneous operation mode 1403 and operates when the operation area is composed of both the HD RB and the FD RB.

The operation of the second embodiment is performed to prevent the operation of the first embodiment from being performed frequently, and the operation on the FD RB may be performed only with the operation of the first embodiment without the second embodiment. When only the first embodiment is performed, in the second embodiment, the UE assumes that it has received the third type of resource allocation (1204 in FIG. 12) (or 1403 which is the FD/HD simultaneous operation mode in FIG. 14) and may perform the corresponding operation.

Third Embodiment

A third embodiment of the disclosure relates to an example of a method in which a base station configures a CRB list and transmits the configured CRB list to a UE.

Figure 15:
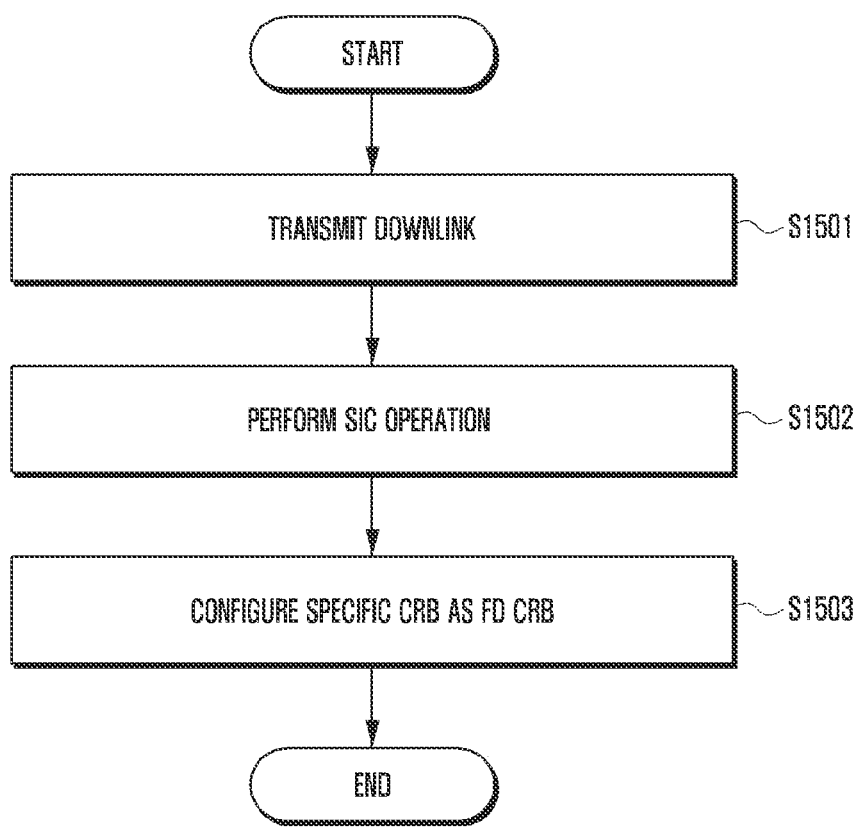
FIG. 15 is a diagram illustrating an operation of a base station according to a third embodiment of the disclosure.

FIG. 15 is a flowchart illustrating an operation performed by a base station to designate a specific CRB as an FD CRB.

Referring to FIG. 15, the base station according to an embodiment of the disclosure may perform downlink transmission in operation S1501. Here, the downlink transmission is a concept including all types of transmission transmitted by the base station, such as general data transmission, RS transmission, and control signal transmission.

After performing the downlink transmission as described above, the base station according to an embodiment of the disclosure may perform a self-interference cancellation (SIC) function in operation S1502. In this case, due to the limitation of the self-interference cancellation function of the base station, it is possible to obtain a self-interference cancellation gain capable of supporting an FD operation only in a specific CRB among all CRBs.

Accordingly, the base station according to an embodiment of the disclosure configures only a specific CRB capable of supporting the FD operation as the FD CRB in S1503.

Figure 16:
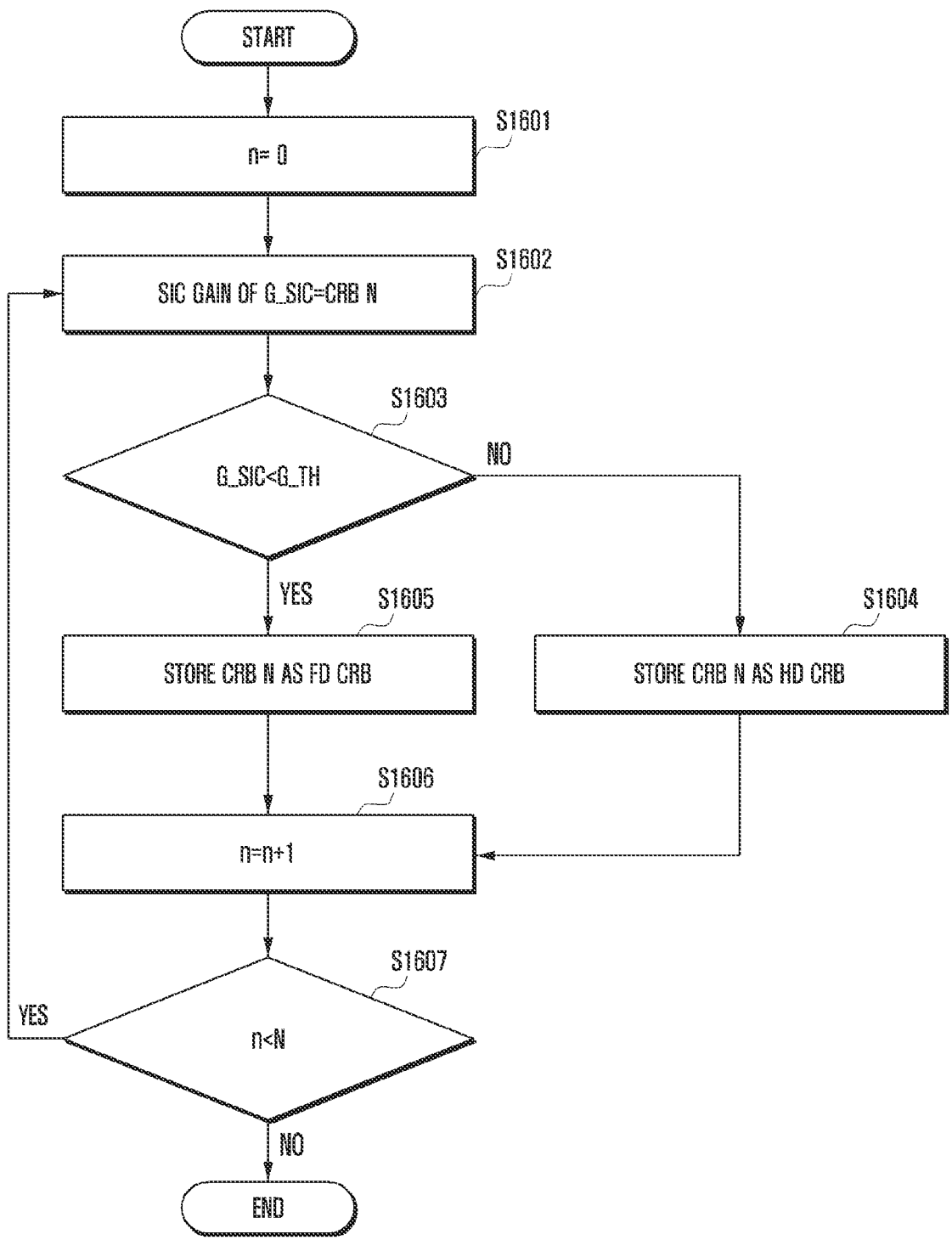
FIG. 16 is a diagram illustrating a specific operation example of a base station in a third embodiment of the disclosure.

FIG. 16 is a flowchart illustrating a more detailed operation for configuring an FD CRB in a base station. In the flowchart of FIG. 16, n denotes a CRB number of a base station, and G_SIC denotes a self-interference cancellation gain when a self-interference cancellation operation is performed in an n-th CRB. Here, the self-interference cancellation gain is a value obtained by dividing self-interference power after performing the self-interference cancellation function by self-interference power before performing the self-interference cancellation function, and has a value less than 1. G_TH is a reference value for designating each RB as an FD CRB. When G_SIC is lower than G_TH, the corresponding CRB is designated as the FD CRB.

The flowchart of FIG. 16 will be described in more detail as follows.

First, the base station transmits data, and then receives and stores the amount of self-interference remaining in each CRB. Thereafter, in operation S1601, the base station identifies whether it is possible to configure the CRBs starting from a 0-th CRB as the FD.

In operation S1602, the base station identifies whether interference is sufficiently cancelled within a range capable of performing an FD operation on the 0-th CRB, through G_SIC. In this case, whether the CRB is configured as the FD CRB may be determined by comparing the identified G_SIC with G_TH. Here, G_TH is a value that may vary depending on components of the base station, channel environment, requirements, and the like.

Referring again to FIG. 16, in operation S1603, the base station according to an embodiment of the disclosure identifies whether the G_SIC for the 0-th CRB is smaller than the G_TH in operation S1603. In operation S1604, the base station configures the 0-th CRB as an HD CRB when the G_SIC is not smaller than the G_TH and configures the 0-th CRB as an FD CRB when the G_SIC is smaller than the G_TH. In order to determine whether interference for the next CRB following the 0-th CRB is cancelled, the next CRB may be identified. This may be an operation of configuring, when the identified CRB is an n-th CRB, a CRB to be identified as an (n+1)-th CRB in operation S105. When the (n+1)-th CRB is less than N, the base station according to an embodiment of the disclosure may repeat the above-described operation.

That is, when it is determined that self-interference for the (n+1)-th CRB is sufficiently cancelled so that FD can be performed, the base station according to an embodiment of the disclosure may configure the (n+1)-th CRB as an FD CRB. When it is determined that the FD cannot be performed, the base station may configure the (n+1)-th CRB as an HD CRB. Such an operation is performed until the (n+1)-th CRB becomes N.

Figure 17:
FIG. 17 is a diagram illustrating a result of an operation of a base station in a third embodiment of the disclosure.
Figure 17:

FIG. 17 is a diagram illustrating an example in which CRBs are classified into FD CRBs and HD CRBs by the operation of the base station of FIG. 16.

Referring to FIG. 17, a CRB in a portion indicated by a hatch indicates an FD CRB, and a CRB in a portion not indicated by a hatch indicates an HD CRB. Depending on the implementation method of the base station's self-interference cancellation function or the channel environment, the mapping type of the CRB is divided into Type 1 1701 in which the FD CRB is continuously configured and Type 2 1702 in which the FD CRB is discontinuously configured. However, since the technique of the disclosure is equally applicable, in the above and below examples, for convenience of description, the type 1 1701 will be assumed and described.

Figure 18:
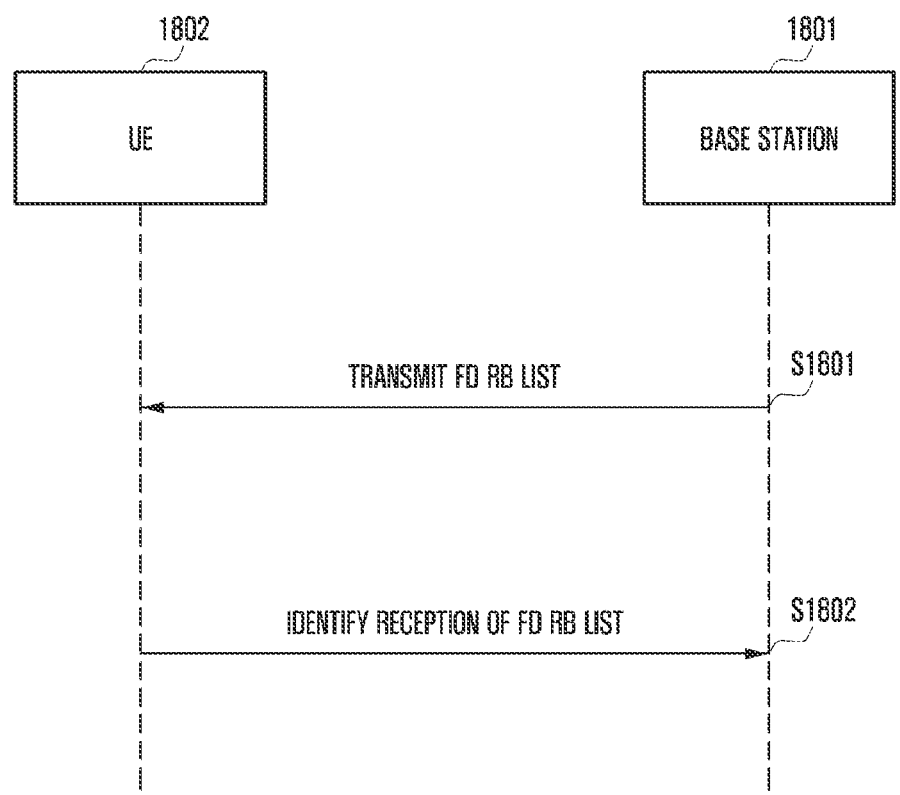
FIG. 18 is a diagram illustrating a message sequence between a base station and a UE according to a third embodiment of the disclosure.

FIG. 18 illustrates a process of transmitting an FD CRB list configured by a base station to a UE.

In this case, as described above, the base station may notify the UE of the FD CRB list in two methods. The first method is to transmit information indicating that a specific CRB is an FD RB by broadcasting to all UEs. The second method is to notify that a specific RB is an FD RB when the UE is allocated an operation area.

According to these two methods, when a base station 1801 according to an embodiment of the disclosure transmits the list of the FD RB to a UE 1802 in operation S1801, at least one UE 1802 that has received the list may transmit a confirmation message indicating that reception of the list of the FD RB has been successful, to the base station 1801 in operation S1802.

Fourth Embodiment

The fourth embodiment shows an example of a process in which a UE performs decoding in consideration of cross-interference of other UEs when receiving a downlink in an area configured as an FD RB.

In this embodiment, the UE is receiving the downlink, and receives a PDCCH from the base station to receive a PDSCH through the FD RB. In this case, the UE receives cross-interference due to the UE scheduled for uplink in the same FD RB. In this case, a downlink reception UE may operate as a function of removing interference after decoding an uplink reception signal in order to reduce the influence of interference from an uplink transmission UE.

Figure 19:
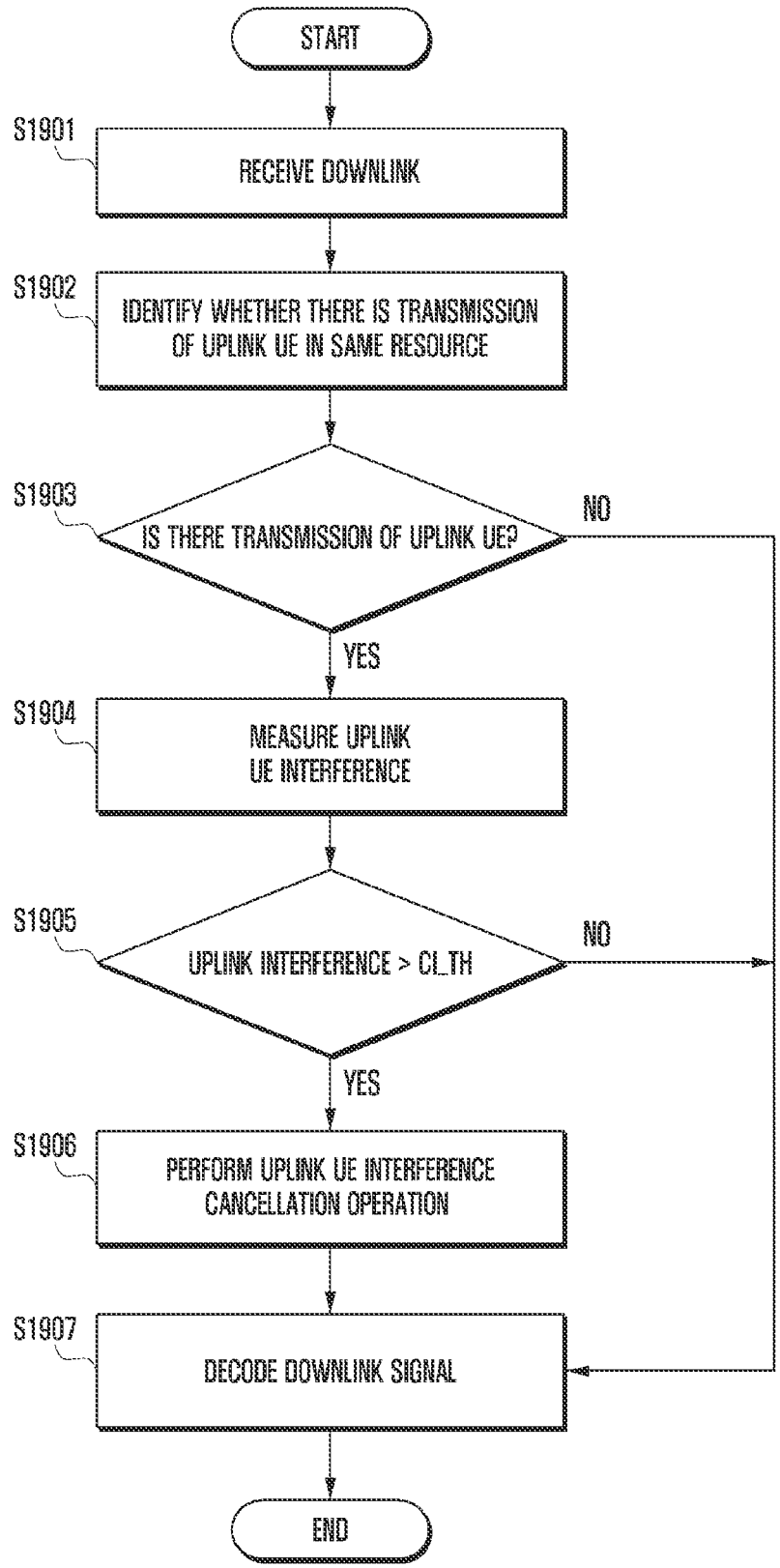
FIG. 19 is a diagram illustrating a specific operation of a UE according to a fourth embodiment of the disclosure.

FIG. 19 is a flowchart illustrating a detailed operation method of the operation of such a downlink UE.

Referring to FIG. 19, a downlink UE receives a downlink from an FD RB in S1901. In this case, the downlink reception means a process before the downlink UE receives a signal for a scheduled RB and then decodes the received signal.

Next, in operation S1902, the downlink UE identifies whether there is an uplink UE using the same resource as the resource receiving the downlink.

There may be two methods for the downlink UE to identify whether the uplink UE exists: a method in which the base station notifies the downlink UE and a method in which the downlink UE identifies a reference signal used by the uplink UE.

For example, when the base station notifies the downlink UE directly, the base station transmits information for the downlink UE to decode uplink interference, such as scheduling information and MCS of the uplink UE, to the downlink UE. In this case, some pieces of information necessary for the decoding may be omitted. For example, the base station transmits only information on whether an uplink UE exists, to the downlink UE.

As another example, when the downlink UE determines the existence of the uplink UE without a separate notification from the base station, the presence of a reference signal used by the uplink UE, such as DMRS, is confirmed to determine whether the corresponding UE exists.

When there is no transmission of the uplink UE for a downlink RB received by the downlink UE in operation S1903, the downlink UE immediately decodes a downlink signal in operation S1907. Unlike this, when there is transmission of the uplink UE in the corresponding RB in operation S1903, the downlink UE measures the amount of interference that the uplink UE using the same resource gives to the downlink UE in operation S1904. At this time, when the amount of interference is smaller than a specific reference value ($C_{i\_TH}$) in operation S1905, the downlink UE ignores the interference of the uplink UE and performs decoding of the downlink signal in operation S1907. When the amount of interference is higher than the specific reference value in operation S1905, the uplink signal is decoded and then an interference cancellation operation is performed in operation S1906. Next, the downlink UE performs decoding on the downlink signal from which the interference signal of the uplink UE is removed in operation S1907.

Fifth Embodiment

This embodiment describes a specific embodiment of performing a different operation with respect to each RB when the UE is scheduled for an FD RB and an HD RB at the same time.

Figure 20:
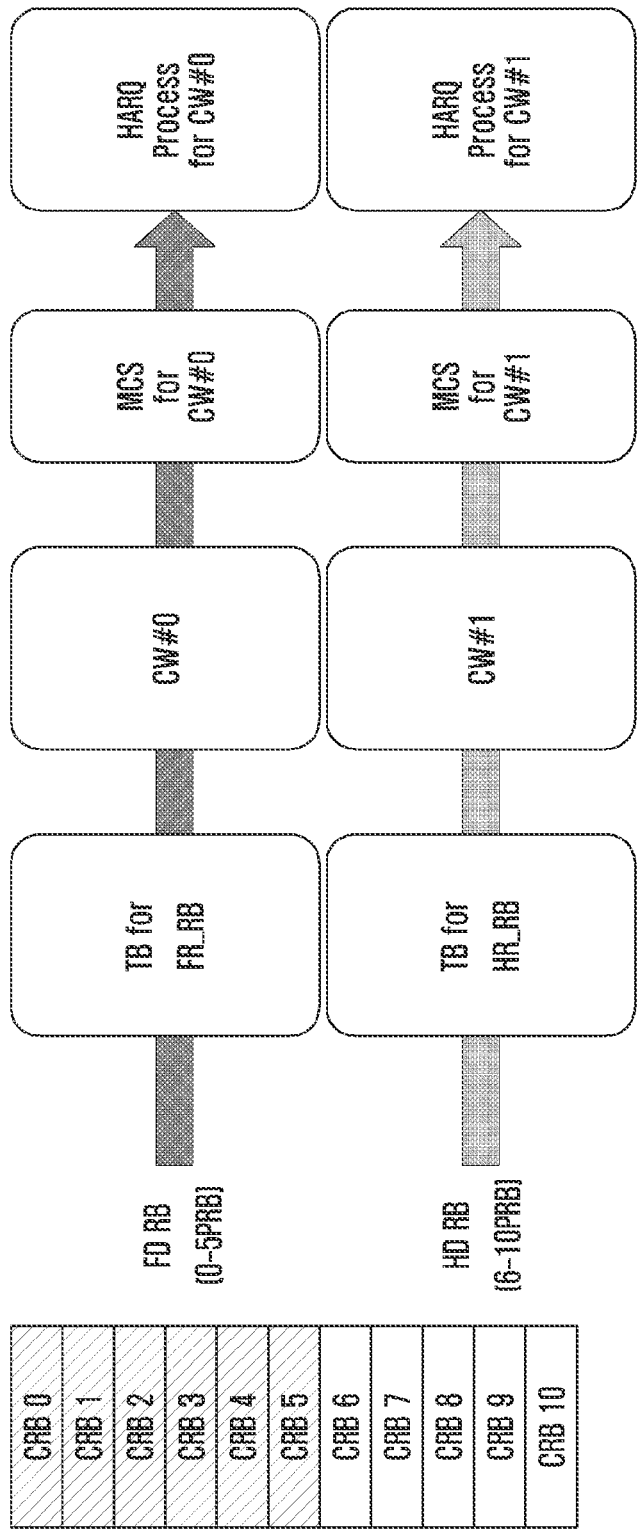
FIG. 20 is a conceptual diagram illustrating an operation of a UE in a fifth embodiment of the disclosure.

FIG. 20 is a diagram illustrating a fifth embodiment. In FIG. 20, the UE is allocated a total of 11 PRBs from 0 to 10, PRBs #0 to #5 are all FD RBs, and PRBs #6 to #10 are HD RBs. In this example, the PRB number, whether the PRB is the FD RB or the HD RB, and each allocation situation do not have any meaning, and are configured only for convenience of description.

As shown in FIG. 20, the UE is in a situation of being allocated all PRBs from PRB 0 to PRB 10 in the operation area. At this time, the UE does not operate on the premise of applying the same transport block (TB), codeword, MCS, and hybrid automatic repeat and request (HARQ) to all PRBs, but operates on the premise of applying different TBs, codewords, MCSs, and HARQs to each of the HD RB and the FD RB. This is because the FD RB may suffer from deterioration in reception or transmission SINR due to interference from other users or self-interference of the base station, compared to the HD RB, and thus may experience lower SINR than the HD RB. Therefore, it may be appropriate to expect performance improvement by applying a different MCS to the FD RB and the HD RB, respectively, rather than allowing the UE to receive the same MCS.

There are two methods of notifying the UE of the TB, codeword, MCS, and HARQ operations applied to each of the two FD RBs and the HD RBs. The first is a method of scheduling the FD RB and the HD RB to the UE through different DCIs, and the second is a method of notifying the UE of difference values such as an MCS difference and an HARQ number difference between the FD RB and the HD RB in advance. In the first method, the UE completely independently recognizes the FD RB and the HD RB and operates, and in the second method, the UE operates in association with the FD RB and the HD RB.

For example, in the first method, the UE receives two or more DCIs for the allocated PRB. In this case, one DCI is a DCI for an HD area, and the other DCI is a DCI for an FD area. The HD DCI area includes all of the contents of the DCI described above, and the area of the scheduling RB is limited to the PRB corresponding to the HD RB.

Therefore, it is assumed that the UE receives a plurality of DCIs at the same reception time point and uses different codewords in the corresponding transmission/reception operations. In this case, using different codewords means that the UE has encoded and decoded resources scheduled by the DCI using different MCSs. It also means that a different HARQ operation is performed for each codeword.

In the second method, the UE additionally receives MCS information and HARQ processing number for FD resources in addition to a portion included in the DCI reception described above. For example, when the UE is scheduled for PRBs #4 and #5, which are FD RBs, and PRBs #6 and #7, which are HD RBs, the DCI notifies that the UE is scheduled for RBs #4 to #7. For this DCI, the UE uses MCS and HARQ numbers for the FD RBs up to #4 and #5, and uses MCS and HARQ numbers for the HD RBs up to #6 and #7. In this case, the UE obtains and uses the MCS and HARQ number of the FD RB from the MCS and HARQ number of the HD RB. At this time, the meaning of obtaining and using is that the UE recognizes the MCS difference between the HD RB and the FD RB from a predetermined parameter between the UE and the base station, and applies and uses the recognized difference, or that the UE decodes additional information included in the DCI to obtain the MCS number of the FD RB.

Sixth Embodiment

This embodiment relates to a method of transmitting an uplink control signal, a control signal of a reference signal downlink, a reference signal, and the like in the FD RB without overlap therebetween when the FD RB is allocated to the UE.

In the case of transmission in the FD RB, since the uplink transmission of the UE and the downlink transmission of the base station occur within the same resource block, when the reference signal and the control signal are damaged by interference, signals that play an important role in performing communication may overlap. Accordingly, it is necessary to arrange the signals so as not to overlap each other through an agreement between the base station and the UE. In this case, the control signal refers to a signal transmitted through the above-described PUCCH or PDCCH, or a signal having a similar role thereto.

In this embodiment, a method of arranging downlink transmission signals and uplink transmission signals so that some of the signals do not overlap according to the signal priorities of the UE and the base station will be described.

As described in the above embodiment, the UE may be allocated only the FD resource from the base station to the operation area. This embodiment relates to a case where the UE is allocated only FD resources to the operation area, and relates to a method of using some resources like the HD even though the UE and the base station are the FD resources.

The UE and the base station classify and define the types of signals that are exchanged with each other as FD operation or HD operation according to a predetermined agreement. For example, data transmitted through a PUSCH and a PDSCH is classified as the FD operation, and DMRS included in the PDSCH and the PUSCH may be defined as the HD operation if necessary. In addition, signals such as synchronization (Sync), acknowledgment (Ack), sounding reference signal (SRS), channel state information-reference signal (CSI-RS), synchronization signal/PBCH block (SSB), master information block (MIB), system information block (SIB), random access Channel (RACH), CSI reporting, etc., may be fundamentally defined as the HD operation.

Among the signals included in the FD operation and the signals included in the HD operation, multiplexing is performed so as not to overlap each other with respect to the signals included in the HD operation. At this time, the arrangement order of the signals is determined according to the priority between the respective signals. For example, one of an uplink CSI report and a downlink DMRS is prioritized, and for a resource element (RE) to which a lower-priority signal is transmitted, for example, a lower-priority downlink or a lower-priority uplink signal is not transmitted and is configured to be mapped to another RE. In this case, in the above example, the priority between each signal is only one example and may be sufficiently changed according to the needs of the UE and the base station.

More specifically, an example of priorities between signals will be described as follows. For example, a PBCH for initial access of the UE is mapped with the highest priority. In addition, a primary synchronization signal (PSS) and a secondary synchronization signal (SSS) corresponding thereto are also mapped with the same priority. Thereafter, the PDCCH and PUCCH corresponding to the control information of the UE and the base station are mapped with the next priority. The PBCH, Sync, PDCCH, and PUCCH are multiplexed on different resources, and in general, after mapping of the PBCH is finished, the mapping priority of the PDCCH and the PUCCH depends on the main type of the base station supporting the UE. For example, in the case of a base station that mainly supports downlink to a UE, since the demand for PDCCH resources is higher than that of PUCCH resources, the priority of the PDCCH is configured high. On the contrary, when the uplink is mainly to be supported, the priority of the PUCCH is configured high.

However, the PDSCH and the PUSCH operate based on the allocation of two different channels within the same resource in the case of a general FD operation. However, only one DMRS for channel estimation may be configured to be mapped to the same RE. Similarly, when a signal such as SR or ACK is transmitted on the PUSCH, the base station may not allocate another downlink channel. In the case of PRACH transmitted in uplink, since it generally corresponds to initial access, the PRACH has a priority after the PBCH.

This is shown in a table as follows.

TABLE 8

| priority | transmission type | channel | included signal | whether uplink/downlink overlapping is possible |
|---|---|---|---|---|
| 0 | downlink | PBCH | PSS, SSS | X |
| 1 | uplink | PRACH | Preamble | O |
| 2-1 | downlink | PDCCH | DCI, Grant | X |
| 2-2 | uplink | PUCCH | UCI, SR, ACK, | X |
| 3-1 | uplink | PUSCH | UL Data | O |
| 3-2 | downlink | PDSCH | DL Data | O |

A resource allocation method according to this example is as follows. First, a PBCH corresponding to priority 0 is allocated. Since uplink/downlink overlapping is not possible for signals corresponding to this channel, both resources in terms of the uplink and resources in terms of the downlink are allocated. At this time, "allocated" means that this channel exclusively occupies the resources. Thereafter, a PRACH corresponding to the priority #1 is allocated. In this case, since the PRACH can overlap other downlink channels in the uplink signal, the PRACH is allocated in terms of uplink resources, but is not allocated in terms of downlink resources. Accordingly, the PDSCH, which is a downlink channel capable of uplink/downlink overlapping, may be additionally allocated in the downlink side. The remaining PDCCH, PUCHH, PUSCH, and PDSCH are also allocated according to the order and whether they overlap.

More specifically, each channel is allocated to each RB according to a rule defined in a cellular system such as NR or LTE. At this time, when another channel that does not allow uplink/downlink overlapping is allocated to the RB to which a specific channel is to be allocated, or when a channel having the same downlink/uplink type is allocated thereto, the specific channel is not allocated to this RB.

Figure 21:
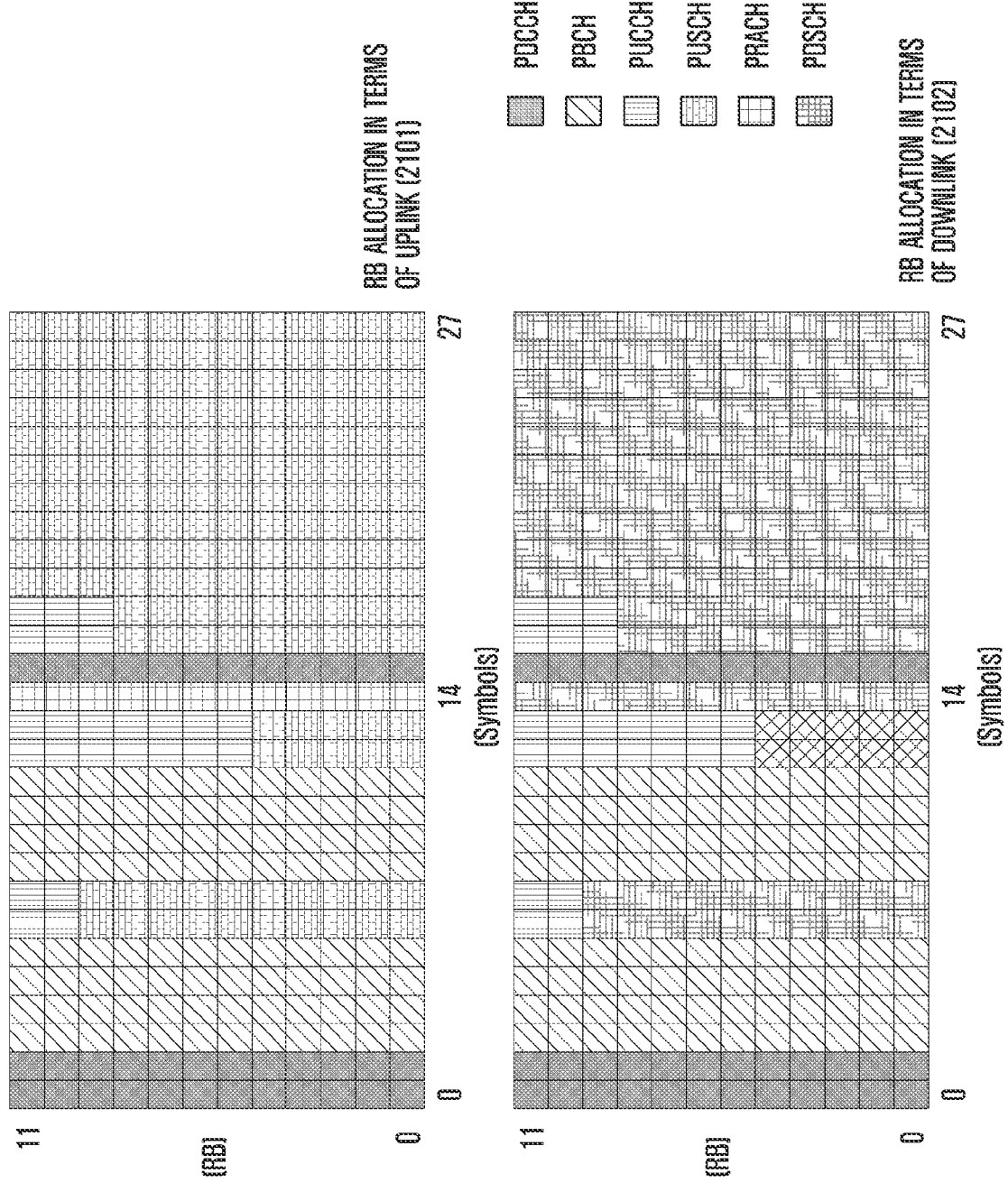
FIG. 21 is a diagram illustrating an example of allocating an RB to each channel according to a method of the disclosure.

FIG. 21 illustrates an example of allocating an RB to each channel according to the method of the disclosure. In FIG. 21, a resource allocation 2101 in terms of uplink and a resource allocation 2102 in terms of downlink indicate the same resource and are interpreted differently depending on a UE and a base station. Overlap-disable signals such as PDCCH. PUCCH, and PBCH are equally mapped to the resource allocation 2101 in terms of uplink and the resource allocation 2102 in terms of downlink. Since channels such as PUSCH, PDSCH, and PRACH may overlap each other, resources allocated to the PDSCH in terms of downlink may be allocated to the PUSCH and the PRACH in terms of uplink.

The priority and whether the overlapping is possible may be changed according to the agreement between the base station and the UE. In addition to this, for each signal, it is possible to define the priority for the arrangement in the RE level other than the RB level and whether the overlapping is possible. As in the example of the above Table, for each signal, the priority in the RE level, the uplink/downlink type, and the uplink/downlink overlapping may be determined and then each RE may be allocated.

In a first step, the UE and the base station first determine whether the priority of signals mapped to the RE can overlap by mutual agreement. Here, the mutual agreement means that the base station and the UE set rules in advance through mutual exchange of opinions, one-sided notification, or an initial installation stage or a manufacturing stage. At this time, whether the overlapping is possible is to determine whether the signal mapped to the RE is a specific signal that should not overlap other signals in a cell (the base station or the UE exclusively uses a different signal for the same resource), or determine whether the UE and the base station can transmit the corresponding signal simultaneously with other signals within the same resource. The first step is generally completed before transmission, so that information shown in Table in the above example, such as the priority for each channel and signal, the transmission type (uplink or downlink), whether uplink/downlink overlapping is possible, etc., should be saved in the base station and the UE.

In a second step, the priority between the uplink overlap-disable signal and the downlink overlap-disable signal is determined. This priority is designed in consideration of the indices of the system of the UE and the base station. According to the example of Table above, information for the initial access of the UE is given the highest priority. Thus, the PBCH is arranged with the highest priority, and then, the channels are arranged in the order of PRACH, PDCCH, PUCCH, PUSCH, and PDSCH. In this case, it is assumed that the priorities of the uplink overlap-disable signal and the downlink overlap-disable signal of the base station and the UE must always be the same and are made by the same rule. In general, the priorities between signals are fixed, but the priorities may be changed through mutual signal exchange between the UE and the base station.

In a third step, an uplink overlap-enable signal and a downlink overlap-enable signal are allocated to the RE to which the overlap-disable signal is not allocated. In this case, the uplink overlap-enable signal and the downlink overlap-enable signal generally refer to transmission data, and may also include some control signals.

The process of this example is performed when the UE is allocated all the operation areas to the FD CRB from the base station.

Seventh Embodiment

In this embodiment, when the base station performs a self-interference function operation, a method of utilizing the RE to increase the performance to measure a self-interference channel will be described.

During a full-duplex operation, the base station removes its own downlink signal, which acts as interference when the base station receives uplink from the UE. In this case, the performance of the self-interference cancellation function of the base station for the full-duplex operation is proportional to the self-interference channel estimation performance of the base station. That is, along with an increase in the self-interference channel estimation performance of the base station, the performance of the self-interference cancellation function of the base station is increased.

Figure 22:
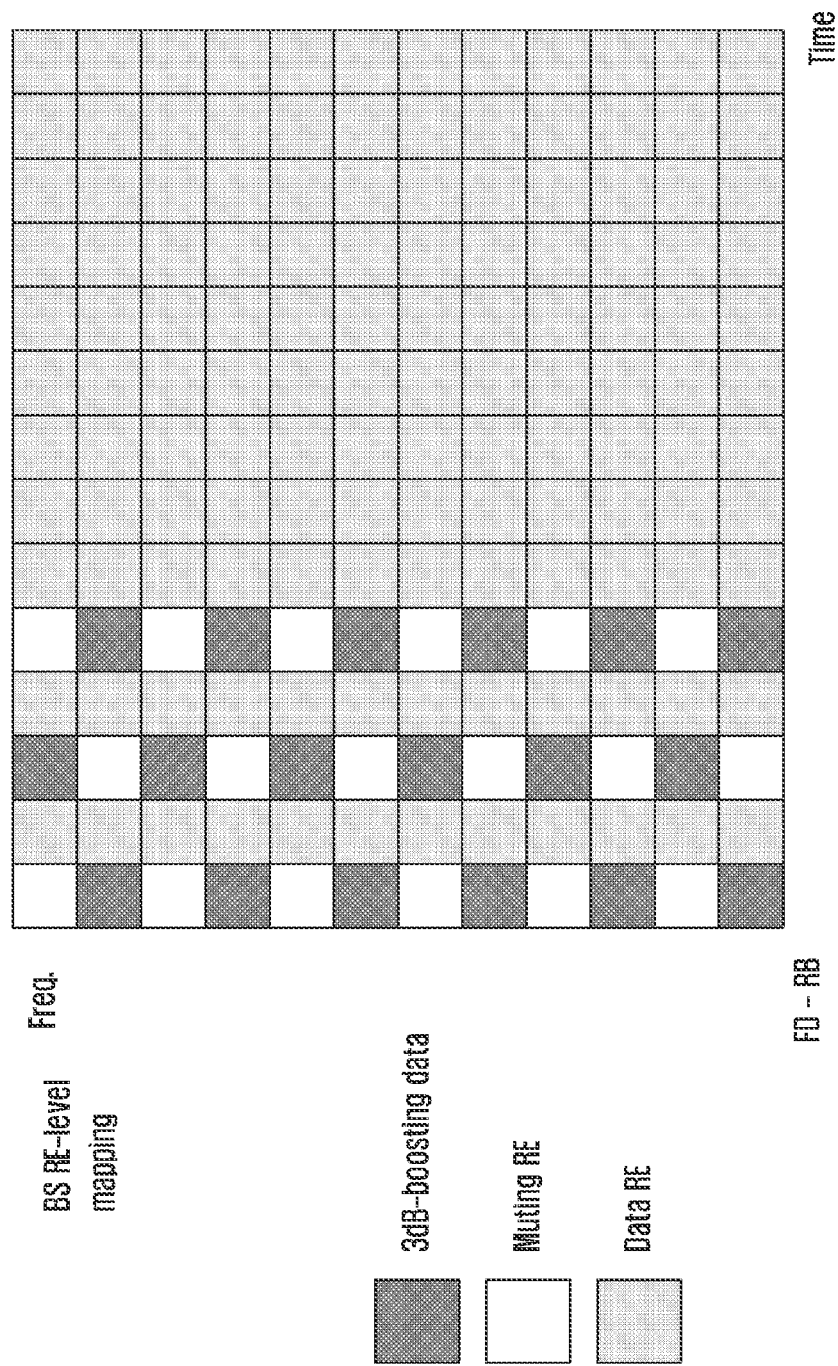
FIG. 22 is a diagram illustrating an RE mapping method of a base station according to a sixth embodiment of the disclosure.

FIG. 22 is a diagram illustrating an example of a method in which a base station operates by muting some REs. In FIG. 22, symbol #0, symbol #2, and symbol #4 on the time axis are symbols used for self-interference channel estimation. It is assumed that a data signal is used because the side that already performs channel estimation can know the corresponding signal even when the data signal is used without the need to use a pilot signal known in advance due to the characteristics of self-interference.

As shown in FIG. 22, when some REs of symbols used for channel estimation are configured as muting REs and power is boosted to other REs for transmission, the reception SNR can be increased during the channel estimation. That is, the performance of channel estimation can be improved when power boosting is performed with respect to the RE transmitting data while transmitting data to the remaining REs without transmitting data to some REs. In this case, the pattern or period of the muting RE does not have any meaning, but increases the transmission power of the RE that transmits data by the ratio of the muting RE and transmits the corresponding data.

Figure 23:
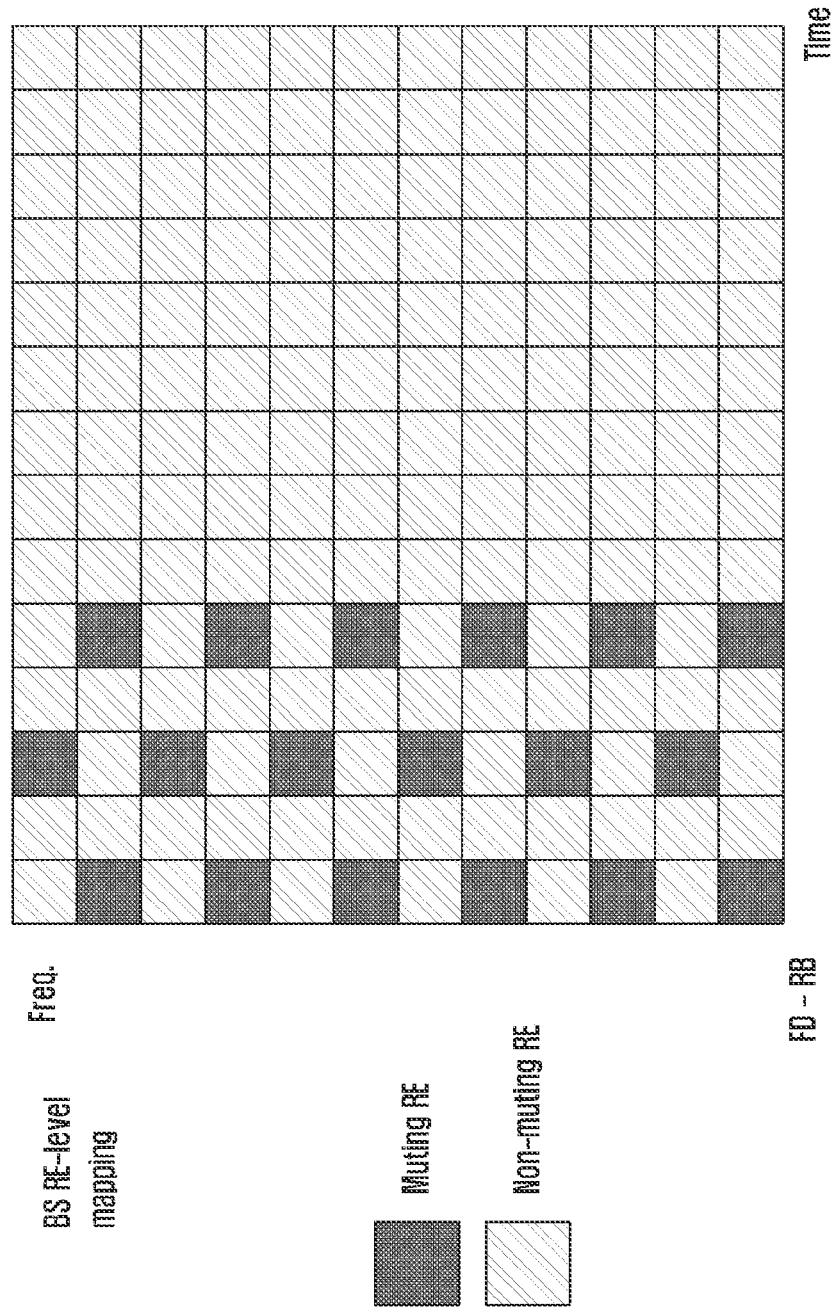
FIG. 23 is a diagram illustrating an RE mapping method of a UE in a sixth embodiment of the disclosure.

FIG. 23 is a diagram illustrating an example in which a UE operates by muting some REs in order to increase the self-interference channel estimation performance of a base station. In FIG. 23, the UE performs muting on other REs (boosted REs), not the part configured as the RE muting by the base station in FIG. 22. This serves to increase the reception SINR of the self-interference channel of the boosted RE. What is meaningful in this example is that the UE mutes the RE boosted by the base station.

Figure 24:
FIG. 24 is a block diagram schematically illustrating a configuration of a base station according to an embodiment of the disclosure.
Figure 25:
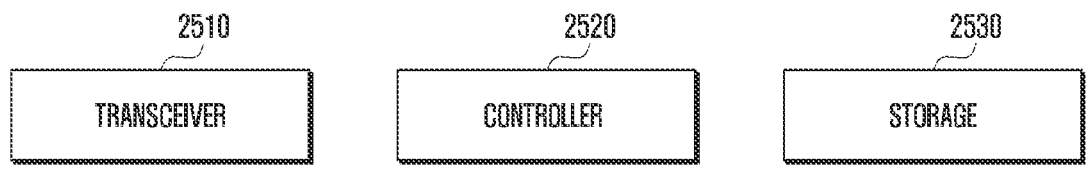
FIG. 25 is a block diagram schematically illustrating the configuration of a UE according to an embodiment of the disclosure.

FIG. 24 is a block diagram schematically illustrating a configuration of a base station according to an embodiment of the disclosure, and FIG. 25 is a block diagram schematically illustrating a configuration of a UE according to an embodiment of the disclosure.

Referring to FIG. 24, the base station according to an embodiment of the disclosure may include a transceiver 2410, a controller 2420, and a storage 2430. In the disclosure, the controller may be defined as a circuit or an application specific integrated circuit, or at least one processor.

The transceiver 2410 of the base station according to an embodiment of the disclosure may transmit/receive a signal to/from another network entity or an external electronic device. For example, the transceiver 2410 may transmit control information and data to the UE, or receive a channel state report and data from the UE.

The controller 2420 of the base station according to an embodiment of the disclosure may control the overall operation of the base station proposed in the disclosure. For example, the controller 2420 may control a signal flow between blocks to perform operations according to the above-described flowcharts. As a more specific example, the controller 2420 may configure and activate an operation area bandwidth of the UE according to an embodiment of the disclosure, may determine an area in which a full-duplex operation is supported and an area in which a half-duplex operation is to be performed, and may generate information indicating the areas. In addition, the controller 2420 may control the transceiver so that the generated information is transmitted to the UE.

The storage 2430 of the base station according to an embodiment of the disclosure may store at least one of information transmitted and received through the transceiver 2410 and information generated through the controller 2420. For example, the storage 2430 may store priority information on signals in order to map the signals to resources.

Referring to FIG. 25, the UE according to an embodiment of the disclosure may include a transceiver 2510, a controller 2520, and a storage 2530. In the disclosure, the controller may be defined as a circuit or an application specific integrated circuit, or at least one processor.

The transceiver 2510 of the UE according to an embodiment of the disclosure may transmit/receive signals to/from another network entity or an external electronic device. For example, the transceiver 2510 may receive control information and data from the base station, or transmit a channel state report and data to the base station.

The controller 2520 of the UE according to an embodiment of the disclosure may control the overall operation of the UE proposed in the disclosure. For example, the controller 2520 may control a signal flow between blocks to perform operations according to the above-described flowcharts. As a more specific example, the controller 2520 controls the transceiver to receive, from the base station, information indicating an area in which a full-duplex operation is supported and an area in which a half-duplex operation is to be performed in the operation area bandwidth of the UE according to an embodiment of the disclosure. In addition, based on the received information, it is possible to control the overall operation so that different communication operations are performed for each area.

The storage 2530 of the UE according to an embodiment of the disclosure may store at least one of information transmitted and received through the transceiver 2510 and information generated through the controller 2520. For example, the storage 2530 may store information about the area configured in the full-duplex mode and the area configured in the half-duplex mode received from the base station.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

The invention claimed is:

1. A method performed by a base station in a wireless communication system, the method comprising:
   identifying a self-interference cancellation gain obtained based on a self-interference cancellation operation for resources in a bandwidth part activated for a terminal, the self-interference cancellation gain obtained for at least one first resource among the resources being less than a threshold and the self-interference cancellation gain obtained for at least one second resource among the resources being greater than or equal to the threshold;
   configuring the at least one first resource as an area of a full-duplex (FD) mode and the at least one second resource as the area of a half-duplex (HD) mode;
   generating information indicating the area of the FD mode and the area of the HD mode; and
   transmitting, to the terminal, the information,
   wherein a modulation and coding scheme (MCS) applied for the area of the FD mode is configured to be lower than an MCS applied for the area of the HD mode.

2. The method of claim 1, further comprising:
   transmitting, to the terminal, data,
   wherein the information is transmitted to the terminal through a radio resource control (RRC) message or downlink control information (DCI), and
   wherein data transmitted in the area of the HD mode is decoded by the terminal after interference by an uplink signal of another terminal is removed, and data transmitted in the second area of the HD mode is decoded by the terminal.

3. The method of claim 1, further comprising:
   generating control information for the bandwidth part; and
   transmitting, to the terminal, the control information,
   wherein the control information includes information on the MCS applied for the area of the HD mode, and
   wherein the MCS applied for the area of the FD mode is determined based on the information and a preconfigured parameter for identifying a difference between the MCS applied for the area of the FD mode and the MCS applied for the area of the HD mode.

4. The method of claim 1, further comprising:
identifying signals to be transmitted in the area of the FD mode and resources to which the signals are to be mapped;
identifying whether a resource for an uplink signal among the identified signals is the same as a another resource for a downlink signal among the identified signals; and
configuring the uplink signal with a higher priority to be mapped to the resource, in case that the resource is the same as the another resource.

5. A method performed by a terminal in a wireless communication system, the method comprising:
receiving, from a base station, information indicating an area of a full-duplex (FD) mode and an area of a half-duplex (HD) mode in a bandwidth part activated for the terminal;
identifying at least one first resource for the area of the FD mode and at least one second resource for the area of the HD mode, among resources in the activated bandwidth part, based on the information; and
performing a first communication operation on the at least one first resource and performing a second communication operation on the at least one second resource,
wherein a self-interference cancellation gain obtained for the at least one first resource is less than a threshold and the self-interference cancellation gain obtained for the at least one second resource is greater than or equal to the threshold, and
wherein a modulation and coding scheme (MCS) applied for the area of the FD mode is configured to be lower than an MCS applied for the area of the HD mode.

6. The method of claim 5, further comprising:
receiving, from the base station, data,
wherein the information indicating the area of the FD mode and the area of the HD mode is received through a radio resource control (RRC) message or downlink control information (DCI), and
wherein the first communication operation includes an operation of decoding data received in the area of the FD mode by removing interference by an uplink signal of another terminal, and the second communication operation includes an operation of decoding data received in the area of the HD mode.

7. The method of claim 5, further comprising:
receiving, from the base station, control information for the bandwidth part,
wherein the control information includes information on the MCS applied for the area of the HD mode, and
wherein the MCS applied for the area of the FD mode is determined based on the information and a preconfigured parameter for identifying a difference between the MCS applied for the area of the FD mode and the MCS applied for the area of the HD mode.

8. The method of claim 5, wherein, in case that a resource for an uplink signal among signals to be transmitted in the area of the FD mode is the same as another resource for a downlink signal among the signals to be transmitted in the area of the FD mode, the uplink signal is configured with a higher priority to be mapped to the resource.

9. A base station in a wireless communication system, the base station comprising:
a transceiver; and
a controller configured to:
identify a self-interference cancellation gain obtained based on a self-interference cancellation operation for resources in a bandwidth part activated for a terminal, the self-interference cancellation gain obtained for at least one first resource among the resources being less than a threshold and the self-interference cancellation gain obtained for at least one second resource among the resources being greater than or equal to the threshold,
configure the at least one first resource as an area of a full-duplex (FD) mode and the at least one second resource as the area of a half-duplex (HD) mode,
generate information indicating the area of the FD mode and the area of the HD mode; and
control the transceiver to transmit, to the terminal, the information,
wherein a modulation and coding scheme (MCS) applied for the area of the FD mode is configured to be lower than an MCS applied for the area of the HD mode.

10. The base station of claim 9,
wherein the controller is further configured to control the transceiver to transmit, to the terminal, data,
wherein the information is transmitted to the terminal through a radio resource control (RRC) message or downlink control information (DCI), and
wherein data transmitted in the area of the FD mode is decoded by the terminal after interference by an uplink signal of another terminal is removed, and data transmitted in the area of the HD mode is decoded by the terminal.

11. The base station of claim 9,
wherein the controller is further configured to generate control information for the bandwidth part and control the transceiver to transmit, to the terminal, the control information,
wherein the control information includes information on the MCS applied for the area of the HD mode, and
wherein the MCS applied for the area of the FD mode is determined based on the information and a preconfigured parameter for identifying a difference between the MCS applied for the area of the FD mode and the MCS applied for the area of the HD mode.

12. The base station of claim 9, wherein the controller is further configured to:
identify signals to be transmitted in the area of the FD mode and resources to which the signals are to be mapped,
identify whether a resource for an uplink signal among the identified signals is the same as a another resource for a downlink signal among the identified signals, and
configure the uplink signal with a higher priority to be mapped to the first resource, in case that the resource is the same as the another resource.

13. A terminal in a wireless communication system, the terminal comprising:
a transceiver; and
a controller configured to:
control the transceiver to receive, from a base station, information indicating an area of a full-duplex (FD) mode and an area of a half-duplex (HD) mode in a bandwidth part activated for the terminal,
identify at least one first resource for the area of the FD mode and at least one second resource for the area of the HD mode, among resources in the activated bandwidth part, based on the information,
perform a first communication operation on the at least one first resource, and a second communication operation on the at least one second resource, wherein a self-interference cancellation gain obtained for the at least one first resource is less than a threshold and the self-interference cancellation gain obtained for the at least one second resource is greater than or equal to the threshold, and wherein a modulation and coding scheme (MCS) applied for the area of the FD mode is configured to be lower than an MCS applied for the area of the HD mode.

14. The terminal of claim 13, wherein the controller is further configured to control the transceiver to receive, from the base station, data, wherein the information indicating the area of the FD mode and the area of the HD mode is received through a radio resource control (RRC) message or downlink control information (DCI), wherein the first communication operation includes an operation of decoding data received in the area of the FD mode by removing interference by an uplink signal of another terminal, and the second communication operation includes an operation of decoding data received in the area of the HD mode, and wherein, in case that a resource for an uplink signal among signals to be transmitted in the area of the FD mode is the same as a another resource for a downlink signal among the signals to be transmitted in the area of the FD mode, the uplink signal is configured with a higher priority to be mapped to the resource.

15. The terminal of claim 13, wherein the controller is further configured to control the transceiver to receive, from the base station, control information for the bandwidth part, wherein the control information includes information on the MCS applied for the area of the HD mode, and wherein the MCS applied for the area of the FD mode is determined based on the information and a preconfigured parameter for identifying a difference between the MCS applied for the area of the FD mode and the MCS applied for the area of the HD mode.

* * * * *